(12) United States Patent
Hinge et al.

(10) Patent No.: US 10,024,323 B2
(45) Date of Patent: Jul. 17, 2018

(54) JOINING OF POLYMER AND SURFACE-MODIFIED SOLID PART

(71) Applicants: Aarhus Universitet, Aarhus C (DK); Grundfos Holding A/S, Bjerringbro (DK); SP Group A/S, Søndersø (DK)

(72) Inventors: Mogens Hinge, Terndrup (DK); Kim Daasbjerg, Skanderborg (DK); Steen Uttrup Pedersen, Lystrup (DK); Joseph Iruthayaraj, Aarhus C (DK); Kristoffer Malmos, Hadsten (DK); Allan Hjarbæk Holm, Langå (DK); Jens Hinke, Roskilde (DK); Susie-Ann Spiegelhauer, Smørum (DK)

(73) Assignees: Aarhus Universitet, Aarhus (DK); Grundfos Holding A/S, Bjerringbro (DK); SP Group A/S, Søndersø (DK)

( * ) Notice: Subject to any disclaimer, the term of this patent is extended or adjusted under 35 U.S.C. 154(b) by 486 days.

(21) Appl. No.: 14/443,559

(22) PCT Filed: Nov. 19, 2013

(86) PCT No.: PCT/DK2013/050389
§ 371 (c)(1),
(2) Date: May 18, 2015

(87) PCT Pub. No.: WO2014/075695
PCT Pub. Date: May 22, 2014

(65) Prior Publication Data
US 2015/0316061 A1    Nov. 5, 2015

(30) Foreign Application Priority Data
Nov. 19, 2012   (DK) .................................. 2012 70713

(51) Int. Cl.
*F04D 13/06*   (2006.01)
*B29C 65/48*   (2006.01)
(Continued)

(52) U.S. Cl.
CPC .... *F04D 13/0626* (2013.01); *B29C 45/14311* (2013.01); *B29C 45/14778* (2013.01);
(Continued)

(58) Field of Classification Search
USPC ...... 156/276, 308.6, 308.8, 309.3, 310, 314, 156/315
See application file for complete search history.

(56) References Cited

U.S. PATENT DOCUMENTS

| 4,341,831 A | 7/1982 | Kleiss |
| 5,607,475 A | 3/1997 | Cahalan et al. |

(Continued)

FOREIGN PATENT DOCUMENTS

| CN | 1372478 A | 10/2002 |
| DE | 10 2006 050 144 A1 | 4/2008 |

(Continued)

OTHER PUBLICATIONS

S. Edmondson, et al. "Polymer brushes via surface-initiated polymerizations" Chem.Soc.Rev. 2004, 33, 14-22. DOI 10.1039/B210143M. Dec. 2003.*

(Continued)

*Primary Examiner* — Burton Mullins
(74) *Attorney, Agent, or Firm* — Knobbe Martens Olson & Bear LLP

(57) ABSTRACT

The present invention relates to alternative methods of joining a solid part (1) and a polymer (2). The methods comprise attaching a primer layer (4) with a predetermined surface chemistry, density and thickness covalently to at least a part of a surface (3) of the solid part (1). Some (Continued)

embodiments of the invention further comprise polymerizing second molecules onto the primer layer (4) so that the surface (3) is at least partly covered with surface immobilized polymer brushes (8). The surface (3) of the solid part (1) is brought into contact with the polymer (2) and a predetermined temperature profile is applied resulting in covalent bonds (6) being established between the polymer (2) and the primer (4), and/or polymer brushes (8) melting or softening and entangling with melted or softened polymer (2) so that the solid part (1) and the polymer (2) remain joined after cooling. The obtained strength of the bonding between the solid part (1) and the polymer (2) is significantly higher than if the same materials are joined with conventional methods not comprising the establishment of a primer layer (4).

17 Claims, 16 Drawing Sheets

(51) Int. Cl.
| | | |
|---|---|---|
| C08J 5/06 | (2006.01) | |
| B29C 45/14 | (2006.01) | |
| B29C 65/82 | (2006.01) | |
| B29C 65/00 | (2006.01) | |
| B29C 65/02 | (2006.01) | |
| C08J 5/12 | (2006.01) | |
| B29C 65/16 | (2006.01) | |
| B29C 65/44 | (2006.01) | |
| B29C 65/52 | (2006.01) | |
| B29L 31/00 | (2006.01) | |

(52) U.S. Cl.
CPC ............ *B29C 65/02* (2013.01); *B29C 65/48* (2013.01); *B29C 65/483* (2013.01); *B29C 65/4815* (2013.01); *B29C 65/4895* (2013.01); *B29C 65/523* (2013.01); *B29C 65/8215* (2013.01); *B29C 66/026* (2013.01); *B29C 66/0344* (2013.01); *B29C 66/1122* (2013.01); *B29C 66/341* (2013.01); *B29C 66/45* (2013.01); *B29C 66/5344* (2013.01); *B29C 66/74* (2013.01); *B29C 66/91411* (2013.01); *B29C 66/91443* (2013.01); *B29C 66/91951* (2013.01); *C08J 5/06* (2013.01); *C08J 5/121* (2013.01); *C08J 5/122* (2013.01); *B29C 65/006* (2013.01); *B29C 65/16* (2013.01); *B29C 65/1635* (2013.01); *B29C 65/1674* (2013.01); *B29C 65/44* (2013.01); *B29C 65/526* (2013.01); *B29C 66/43* (2013.01); *B29C 66/71* (2013.01); *B29C 66/7422* (2013.01); *B29C 66/7444* (2013.01); *B29C 66/7461* (2013.01); *B29C 66/7465* (2013.01); *B29C 66/74281* (2013.01); *B29C 66/74283* (2013.01); *B29C 66/74285* (2013.01); *B29C 66/8322* (2013.01); *B29L 2031/7496* (2013.01)

(56) References Cited

U.S. PATENT DOCUMENTS

| | | | |
|---|---|---|---|
| 6,013,855 A | 1/2000 | McPherson et al. | |
| 6,136,732 A | 10/2000 | Patel | |
| 6,692,914 B1 * | 2/2004 | Klaerner | C08F 4/00 435/6.11 |
| 6,994,964 B1 * | 2/2006 | Chang | C07H 21/00 435/6.11 |
| 7,405,034 B2 * | 7/2008 | Yan | G03F 7/11 427/331 |
| 7,456,241 B2 * | 11/2008 | McFaddin | C08F 255/02 525/192 |
| 8,124,188 B2 * | 2/2012 | Meagher | C08J 7/123 427/340 |
| 8,709,195 B2 * | 4/2014 | Halladay | C09J 121/00 156/283 |
| 9,071,091 B2 * | 6/2015 | D'Antonio | H02K 5/128 |
| 2002/0183856 A1 | 12/2002 | Yamauchi et al. | |
| 2003/0135197 A1 | 7/2003 | Wang et al. | |
| 2004/0144655 A1 * | 7/2004 | Bertrand | C08F 2/58 205/235 |
| 2007/0044901 A1 | 3/2007 | Chen et al. | |
| 2007/0212528 A1 * | 9/2007 | MacKay | B29C 70/60 428/206 |
| 2008/0004363 A1 | 1/2008 | Rosenberger | |
| 2012/0180950 A1 * | 7/2012 | Attarwala | C09J 4/00 156/293 |
| 2013/0327392 A1 * | 12/2013 | Weitekamp | H01L 31/02363 136/256 |
| 2015/0050507 A1 * | 2/2015 | Hinge | B29C 65/1635 428/463 |

FOREIGN PATENT DOCUMENTS

| | | |
|---|---|---|
| DE | 10 2007 009 928 A1 | 7/2008 |
| DE | 2008 000 517 A1 | 9/2009 |
| EP | 2 011 638 A1 | 1/2009 |
| EP | 2 243 620 A2 | 10/2010 |
| FR | 1 273 223 | 10/1961 |
| JP | 2009-39987 A | 2/2009 |
| WO | WO 00/20157 A1 | 4/2000 |
| WO | WO 02/090455 A1 | 11/2002 |
| WO | WO 02/098926 A2 | 12/2002 |
| WO | WO 2011/011772 A1 | 1/2011 |
| WO | WO 2012/074083 A1 | 6/2012 |

OTHER PUBLICATIONS

"The coatings of tomorrow" article from iNANO Annual Report, Aarhus University, Feb. 2009.
Nielsen, Steen Erik "Laser welding of metal and plastic" The Iron and Machine Industry, Aug. 2012, Week 35, p. 20.
International Search Report for PCT/DK2013/050389 dated Feb. 21, 2014.

* cited by examiner

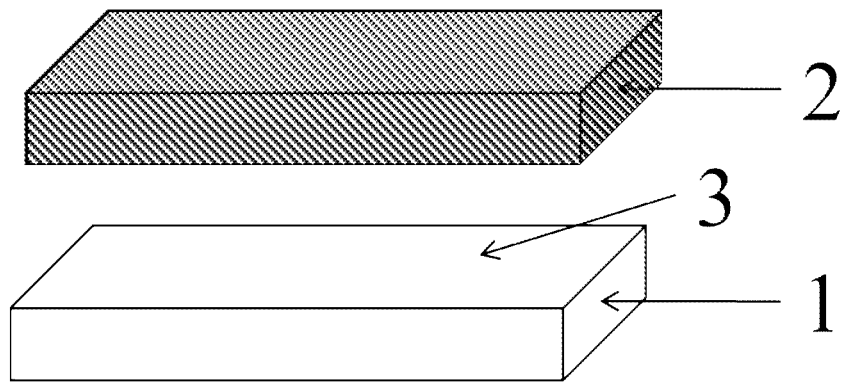
Fig. 1.a
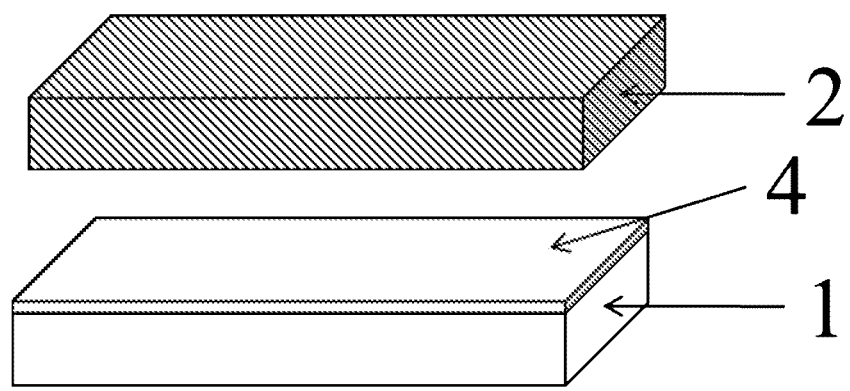
Fig. 1.b

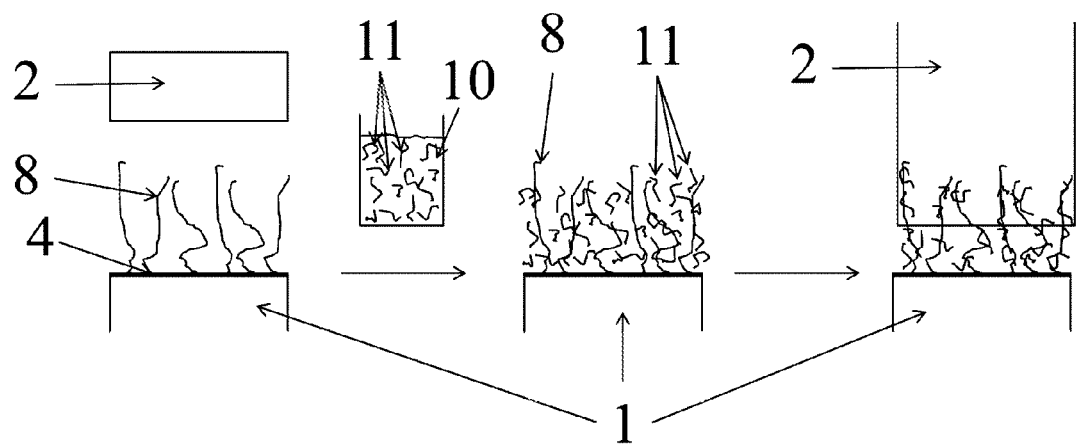
Fig. 19
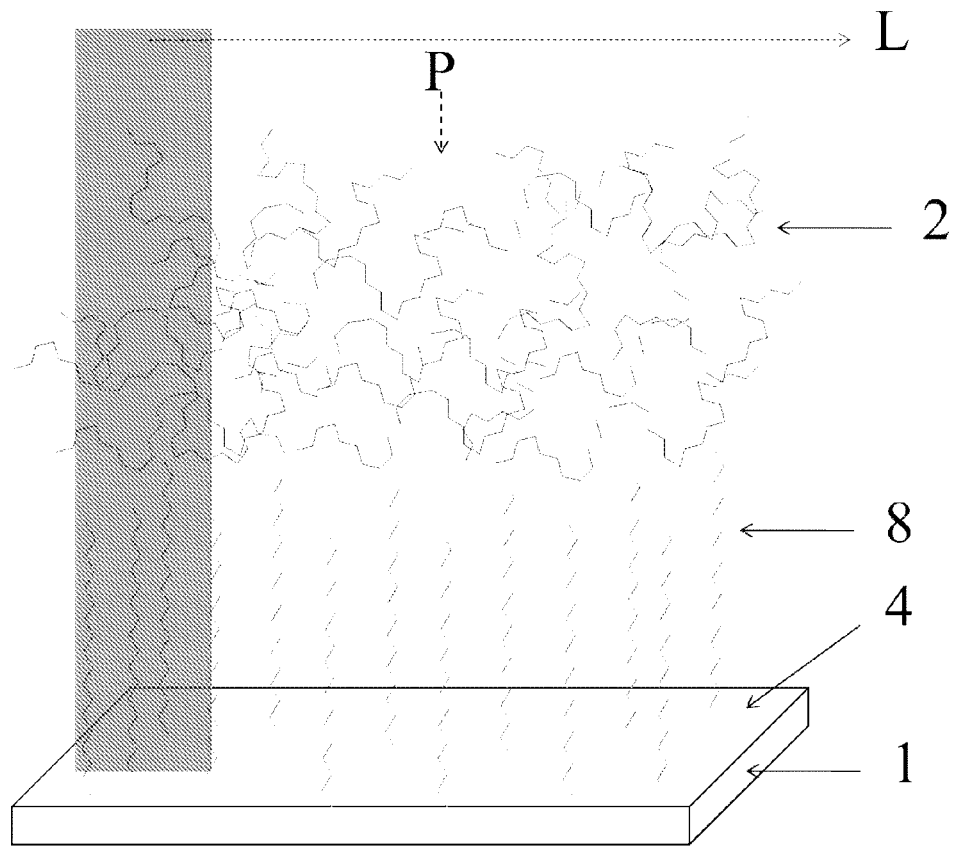
Fig. 20.a

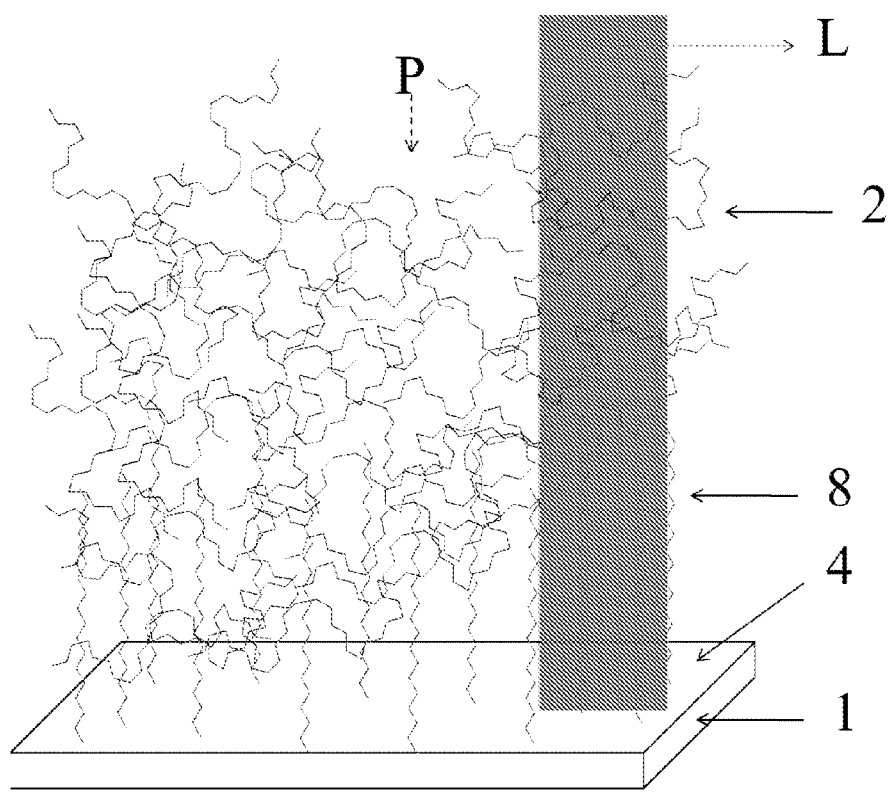
Fig. 20.b
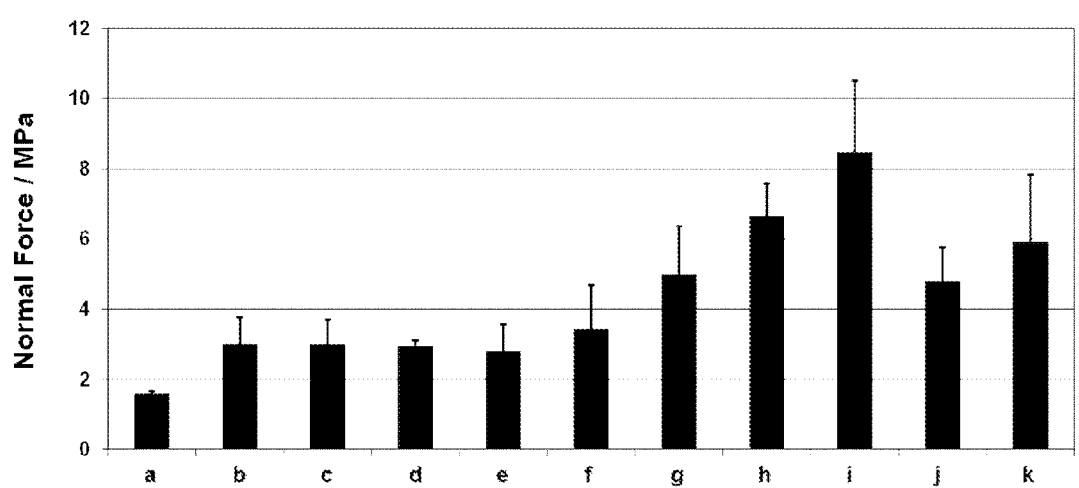
Fig. 21

JOINING OF POLYMER AND SURFACE-MODIFIED SOLID PART

CROSS REFERENCE TO RELATED APPLICATIONS

This application is a U.S. National Phase Application of PCT International Application Number PCT/DK2013/050389, filed on Nov. 19, 2013, designating the United States of America and published in the English language, which is an International Application of and claims the benefit of priority to Danish Patent Application No. PA 2012 70713, filed on Nov. 19, 2012. The disclosures of the above-referenced applications are hereby expressly incorporated by reference in their entireties.

FIELD OF THE INVENTION

The present invention relates to joining of a surface-modified solid part and a polymer.

BACKGROUND OF THE INVENTION

Joining of a polymer and a solid part, which may e.g. be made from metal, ceramic or a polymer, are relevant for a very large number of applications including application of a coating and decorative casings in consumer electronics, insertion of wiring into electronic control boxes, bearings, and many others.

The polymer and the solid part are typically joined either by mechanical joining, e.g. by interlocking, or by adhesion. In often used adhesive methods, a glue is first applied to one or both of the two components to be joined. They are then pressed together to form the completed joint. However, suitable adhesives are commonly associated with long curing times, sensitivity to ambient conditions, such as humidity and temperature, and the need for extensive surface pre-treatment, such as etching or corona treatment. Furthermore, the layer of adhesive fills a gap between the components to be joined, and this additional thickness is undesirable for some applications. In addition, the interfaces obtained with known adhesive methods are prone to degradation over time when exposed to various environmental factors as e.g. humidity and elevated temperatures. Hence, breakage at the interface can occur, resulting in delamination which for industrial use, as highlighted by the medico industry, is unacceptable. In the coating industry the adhesion is often based on interlocking after e.g. sand blasting and physical adhesion.

In addition, there are a range of material combinations that cannot be assembled by the gluing and interlocking methods. In particular cases it is also not desirable to rely on mechanical joints, e.g. ribbon. This may e.g. be due to an increased weight or dimensional constraints. In such cases new and practically invisible joining methods that also allow the combination to withstand extreme environment loads would be highly attractive.

Some of the visions that later resulted in the present invention was presented in the article "The coatings of tomorrow" in "Arsskrift for iNANO", published February 2008.

OBJECT OF THE INVENTION

It is an object of the present invention to provide a method that generates chemical bonds and/or entanglements between a solid part and a polymer that have a higher bonding strength than is obtainable with known adhesive methods of industrial relevance.

It is another object of the present invention to provide a method that generates strong durable chemical bonds between a solid part and a polymer.

It is another object of the present invention to provide a method for joining a solid part and a polymer that may otherwise be incompatible.

It is another object of the present invention to provide a method that generates chemical bonds/interactions between a solid part and a polymer that significantly limits transport of liquid, e.g. water, along the joining interface.

It is another object of the present invention to provide a method that is more resistant to environmentally facilitated degradation than known adhesive methods of industrial relevance.

It is another object of embodiments of the present invention to provide a method with which complex three-dimensional parts can be joined at pre-determined positions while leaving other positions un-joined.

It is a further object of the present invention to provide an alternative to the prior art.

SUMMARY OF THE INVENTION

Thus, the above described object and several other objects are intended to be obtained in a first aspect of the invention by providing a method of joining a solid part and a polymer, the method comprising the steps of:
  attaching a primer layer with a predetermined surface chemistry, density and thickness covalently to at least a part of a surface of the solid part,
  heating the primer layer with a first predetermined temperature profile until at least a part of the primer has been activated,
  simultaneously with or subsequently to the step of heating, bringing the primer layer attached to the surface of the solid part into contact with the polymer so that an interface is obtained comprising the surface, the activated primer and a part of the polymer adjacent to the primer,
wherein a second predetermined temperature profile is applied at least to the interface, resulting in covalent bonds being established between the polymer and the primer so that the solid part and the polymer remain joined after cooling.

By "primer" is preferably meant a compound applied to facilitate covalent bonding to the surface of the solid part.

The heating of the primer layer with a first predetermined temperature profile results in an activation thereof which can be considered a deterioration of the surface. By "activated" in relation to the primer is preferably meant that the primer is chemically or physically modified or transformed to obtain another chemical or physical composition or structure. It may e.g. be partly thermal decomposition of the primer, rearrangements, radical formation or similar. The intention is to leave activated sites on the primer layer that are able to react with or onto an incoming polymer. By way of example it could be, e.g. homolytical cleavage of the nitro group from 4-nitro-1-phenyl primer leaving a highly reactive phenyl radical attached to the surface.

Alternatively, the above described object and several other objects are intended to be obtained by providing a method of joining a solid part and a polymer, the method comprising the steps of:

attaching a primer layer with a predetermined surface chemistry, density and thickness covalently to at least a part of a surface of the solid part, polymerizing second molecules onto the primer layer so that the surface is at least partly covered with surface immobilized polymer brushes, bringing the surface with the polymer brushes into contact with the polymer, so that an interface is obtained comprising the surface, the primer, the polymer brushes and a part of the polymer adjacent to the primer, wherein a predetermined temperature profile is applied at least to the interface, and/or wherein a solvent is applied to the polymer brushes and/or to the polymer prior to the step of bringing the surface with the polymer brushes into contact with the polymer, so that the polymer brushes melt or soften and entangle with melted or softened polymer so that the solid part and the polymer remain joined after cooling.

The use of the wording "second molecules" refers here to the fact that molecules are also present in the primer.

By "predetermined surface chemistry" of the primer is preferably meant that it is selected in accordance with the materials being joined. For the methods comprising polymer brushes, the choice of primer is also related to the polymer brushes to be polymerized thereon, which again depends on the type of polymer to be joined to the solid part.

Alternatively, the above described object and several other objects are intended to be obtained by providing a method of joining a solid part and a polymer, the method comprising the steps of:

attaching a primer layer with a predetermined surface chemistry, density and thickness covalently to at least a part of a surface of the solid part, polymerizing second molecules onto the primer layer so that the surface is at least partly covered with surface immobilized polymer brushes containing chemical functionalities amenable to thermal rearrangements, chain scission, fragmentation, or the like, heating the surface with the polymer brushes with a first predetermined temperature profile resulting in at least partial activation of the polymer brushes and/or incorporated functional groups thereof, simultaneously with or subsequently to the step of heating, bringing the surface into contact with the polymer so that an interface is obtained comprising the surface, the primer, the polymer brushes, and a part of the polymer adjacent to the primer, wherein a second predetermined temperature profile is applied at least to the interface, and/or wherein a solvent is applied to the polymer brushes and/or to the polymer prior to the step of bringing the surface with the polymer brushes into contact with the polymer, so that the polymer brushes melt or soften and mix with melted or softened polymer and so that covalent bonds are established between the primer, the polymer brushes and/or the polymer so that the solid part and the polymer remain joined after cooling.

The above described methods are considered to be alternative methods which can be applied to obtain the objects of the present invention and solve the underlaying technical problems. Please note that in the claims and in parts of the description, the alternative methods are mentioned in another order than above.

In any of the above mentioned methods, the first and second predetermined temperature profiles may overlap or may form one continuous temperature profile. The actual temperature profiles to be used for a given application and for a given combination of materials and geometries can e.g. be determined by experimentation and/or by theoretical approaches possibly including computer simulations.

With any of the methods described above, the obtained strength of the bonding/interaction between the solid part and the polymer is preferably significantly higher, such as at least 30% higher, than if the same materials are joined with conventional adhesive methods not comprising the establishment of a primer layer and/or of polymer brushes in accordance with the present invention. A more important result than the short term strength is that the obtained bonding is durable over long periods of time even under severe physical and chemical impact. By "durable" is preferably meant that the strength does not decrease significantly over time.

The actual obtainable strength and the obtainable value of adhesion [Kp/cm] as well as the percentage improvement as compared to prior art depend on the types of materials being joined as well as the primer. It may furthermore be possible to maximize the bonding strength by careful optimization of the process parameters.

The actual bonding/interaction obtained between the primer and the surface of the solid part will be a question of chemistry, and the control thereof will be well known to a person skilled in the art.

The surface density of the primer may be constant over the surface, or it may be varying. It may e.g. be desired to have a larger density at an edge of a surface to be joined with the polymer in order to improve the tear strength of the bonding.

The solid part may be pre-heated before and/or after being joined with the polymer to reduce the temperature difference and thereby reduce the risk of thermal stresses in the bonding.

The temperature profile applied to the materials during the joining methods are often referred to as the heating, annealing and cooling phases, respectively. The temperature at the interface of contact is preferably controlled both in the heating, annealing, and cooling phase in order to ensure good reaction yield and minimize any unwanted mechanical side-effects, e.g. creep or warpage. An example of a temperature profile is that the temperature slopes upwards at a constant or varying rate to a certain upper limit, is kept constant for a certain period of time, and then slopes downwards at a constant or varying rate. It may also comprise annealing at a first holding temperature followed by heating to a second holding temperature. The actual temperatures, rates of changes and holding times at a constant temperature are predefined and adjusted according to the requirements; these are closely related to the actual materials and the geometries of the parts to be joined.

The heating will typically be applied by increasing the temperature of the environment in which the solid part and the polymer are located, such as inside an injection moulding machine used to apply a layer of melted polymer. However, the heating may alternatively be procured by energy sources providing a local heating of the areas to be joined, such as by light or electrical power. The heating of the primer covered surfaces may procure a sideproduct that escapes.

Alternatively or in combination therewith, the heating may procure thermal rearrangements or chain scissions that open or degrade bonds inside the layer or from side groups of the brushes leaving sites for reactions. If there are any byproducts which are to escape, it could e.g. be gasses, such as $N_2$ or the like.

The heating applied and thus temperatures reached should preferably be so low that degradation of the polymer part is avoided or at least controlled to an acceptable extent.

By use of the methods described, it is possible to obtain a more clean process than what is e.g. the case when a metal and a polymer part are joined by gluing.

In addition to using a predetermined temperature profile, one or more other process parameters may also be varied, preferably in a controlled manner, during the process. Examples of such parameters are: the applied pressure with which the polymer is injected into the mould and onto the solid part, the packing time after an injection of liquid polymer in order to allow the joined parts to be cooled to a pre-determined extent, the initial temperature of the solid part and/or the polymer to be joined, the tool temperature in the machine, the use of an inert atmosphere during the joining process, and the thickness of the polymer coating or laminate.

In embodiments of the invention comprising polymerizing the primer to obtain polymer brushes, the step of polymerizing may have a duration resulting in a predefined average length and/or average density of the polymer brushes. The actual values of length and average density depend on the materials to be joined, and control of these parameters can be used to control and optimize the resulting bonding/entanglement for a given combination of materials. The density of the polymer brushes may be optimized, depending on the type of polymer, to ensure that there are enough brushes to provide a good entanglement and bonding. If the density becomes too large, the entanglement may become less efficient.

In any of the methods comprising polymer brushes and comprising the step of applying a solvent to the polymer brushes, the solvent may contain polymer chains of same type of polymer as the one to be joined with the solid part. These polymer chains will entangle with the polymer brushes which has proven to result in a better bonding between the polymer brushes and the polymer being joined thereto.

Such methods comprising application of a solvent containing polymer chains, may further comprise the step of heating the polymer brushes with the solvent applied thereto before the solid part with the primer and polymer brushes is brought into contact with the polymer to be joined with the solid part.

In some embodiments of the invention, the polymer is liquid while being brought into contact with the solid part. By "liquid" is preferably meant that it has a temperature above the melting temperature defined as the temperature at which a thermodynamic first order transition takes place resulting in melting crystalline solid into liquid or is dissolved/suspended in a liquid media. This may be the case in processes involving heating the polymer to a melted state, such as e.g. injection moulding, spray coating, brush application, dip coating, and extrusion.

In other embodiments of the invention, the polymer is solid when being brought into contact with the solid part, and at least the interface is subsequently heated. Examples of such processes are: friction welding, heat pressing, powder coating, electrostatic coating, and sintering.

In any of the embodiments above, the primer layer may have a surface density of $0.1\text{-}100\times10^{-10}$ mol per square centimeter and a thickness of 1-1000 nanometers. In a preferred embodiment of the invention, the primer layer has a surface density of $3\text{-}12\times10^{-10}$, such as $4\text{-}10\times10^{-10}$ mol per square centimeter, as this is considered appropriate for ensuring the primer layer being as close to a perfect single layer of molecules as possible with the presently available methods.

The solid part to be joined with a polymer by use of a method according to the present invention may be made from metal, ceramic, polymer, glass, carbon, or materials comprising an outer coating of said materials, or a combination thereof. It may e.g. be a composite material, such as a fibre reinforced polymer. The solid part may be made from metal selected from the group consisting of Fe, Cr, Cu, Al, nickel, platinum, gold, or alloys, such as stainless steel or brass.

For some embodiments of the invention where the solid part is electrically conducting, the primer may be attached to the surface of the solid part by electrochemical grafting. The surface may have been electrochemically activated while the primer is attached in order to enable establishment of covalent bonding between the primer and the surface of the solid part.

The present invention may in principle be applied to any type of polymers, regardless of whether they are bulk, engineering, or high performance polymers. There are no key required property of the polymer that enables the approach, it could in principle, be applied to any type.

A method according to the present invention may further comprise one or more of the following steps:
- selecting a primer to match the polymer to be joined with the solid part,
- selecting the surface chemistry, density and thickness of the primer in accordance with the solid part and polymer to be joined,
- when the method involves polymer brushes, selecting the type of polymer brushes to match the polymer to be joined, and
- selecting temperature profiles to be used during the process in accordance with the solid part and polymer to be joined.

The temperature profiles inherently comprise values for both the temperatures, the holding times at constant temperatures, and the heating and cooling rates.

The primer may be the same type of polymer as the polymer which is being joined with the solid part. Hereby a good mixing between the polymer brushes and the polymer chains of the melted or softened bulk polymer may be ensured, whereby the strong bonding can be obtained.

A second aspect of the invention relates to an item comprising a solid part and a polymer which have been joined by a method according to the present invention. Such items may e.g. be metal connectors between the inside and outside of a plastic compartment, polymer coatings in tough applications requiring better immobilization methods than current state of the art, polymeric cans and a metal ring or insert to be used in a electrical motor application, etc.

In a specific embodiment of the invention, the item is a rotor can for use in a centrifugal pump, wherein the solid part is a metal collar of the can and the polymer is a tubular body of the can.

For such a rotor can, the joining may have been made in an injection moulding process. The activation of the primer layer on the collar may be made in the mould by the heat of the mould.

For a rotor can as described above, the collar may be subjected to mechanical structuring on its surface before having a primer layer attached thereto, the structuring being mechanical, chemical, or by laser. Such an organic chemical coating may be applied to the collar before joining.

The first and second aspects of the present invention may each be combined. These and other aspects of the invention will be apparent from and elucidated with reference to the embodiments described hereinafter.

BRIEF DESCRIPTION OF THE FIGURES

The method of according to the invention will now be described in more detail with regard to the accompanying figures. The figures show one way of implementing the present invention and is not to be construed as being limiting to other possible embodiments falling within the scope of the attached claim set.

FIG. 1.a shows schematically a solid part and a polymer before joining, and FIG. 1.b shows schematically the solid part having a primer layer attached thereto on a surface to be joined with the polymer.

FIG. 2 shows a reactive primer present above the solid part, and FIG. 3 shows the primer attached to the upper surface of the solid part.

FIG. 4 shows the polymer above the surface with the primer, and FIG. 5 shows the polymer chains of the polymer attached to the primer.

FIG. 6 shows schematically a cross sectional view of the joined solid part and polymer.

FIG. 7 shows another primer above the upper surface of the solid specimen, and

FIG. 8 shows the situation where the primer has been attached by covalent bonds.

FIG. 9 shows the initiator.

FIG. 10 shows the polymer brushes after a certain time period of the polymerization step.

FIG. 19 shows schematically a method comprising application of a solvent containing polymer chains which react with the polymer brushes.

FIGS. 20.a and 20.b show schematically an embodiment of the invention wherein laser welding is used to apply heating.

FIG. 21 shows experimental results of tests of the normal strength of stainless steel items with surface immobilized PMMA brushes of various lengths.

DETAILED DESCRIPTION OF AN EMBODIMENT

Figure 2:
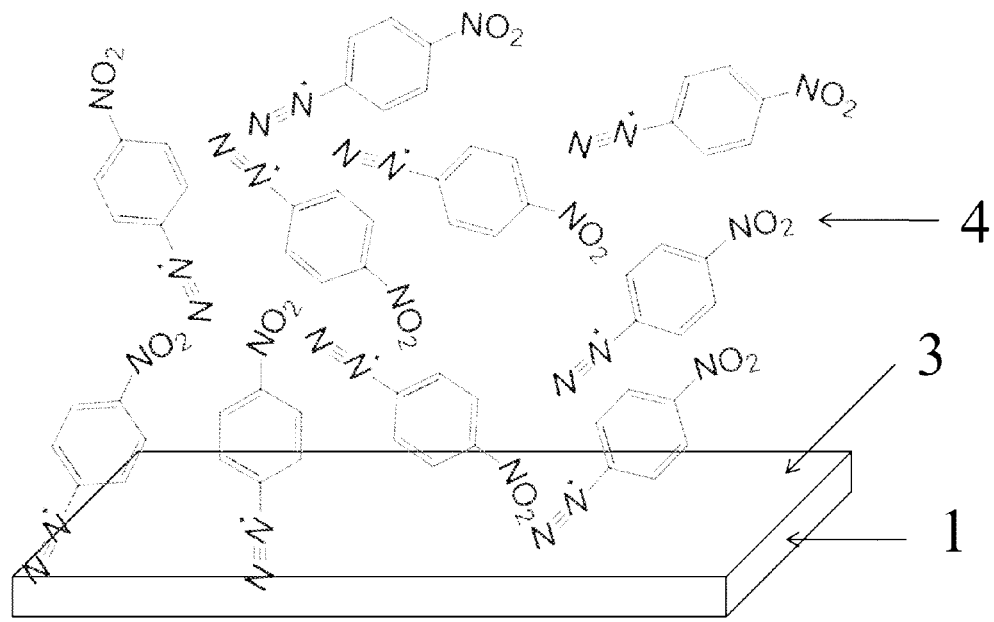
FIGS. 2 to 6 show schematically how a solid part and a polymer are joined by a first method according to the invention.

The present invention relates to alternative methods of joining a solid part and a polymer so that the strength of the bonding and/or the durability is enhanced when compared to known methods. The methods are e.g. advantageous for applications where it is inappropriate to use other methods of joining, such as mechanical joining or gluing. They are particularly advantageous for applications or materials where high bonding strengths are important over long periods of time or under harsh environmental impact, including immersion in boiling water.

A core idea behind the invention is to covalently attach a primer layer with a predetermined surface chemistry, density and thickness covalently to at least a part of a surface of the solid part. FIG. 1.a shows schematically the solid part 1 comprising a surface 3 to be joined with a polymer 2. In the figure, the polymer 2 is shown as a solid part for illustrative purposes only; it may also be polymer being in a liquid state when being joined with the solid part 1. FIG. 1.b shows the solid part 1 covered with a primer layer 4 on an upper surface 3. The surface is referred to as an upper surface in the following with reference to the drawings; in practise it could also be one or more of the other surfaces. In the figure, the whole surface 3 is covered by the primer 4, but it will also be possible to cover only part of the surface 3 if desired. This can e.g. be obtained by scanning electrochemical modification (SECM), partial submersion, or lithographical methods. The alternative methods of joining have this step in common.

Figure 3:
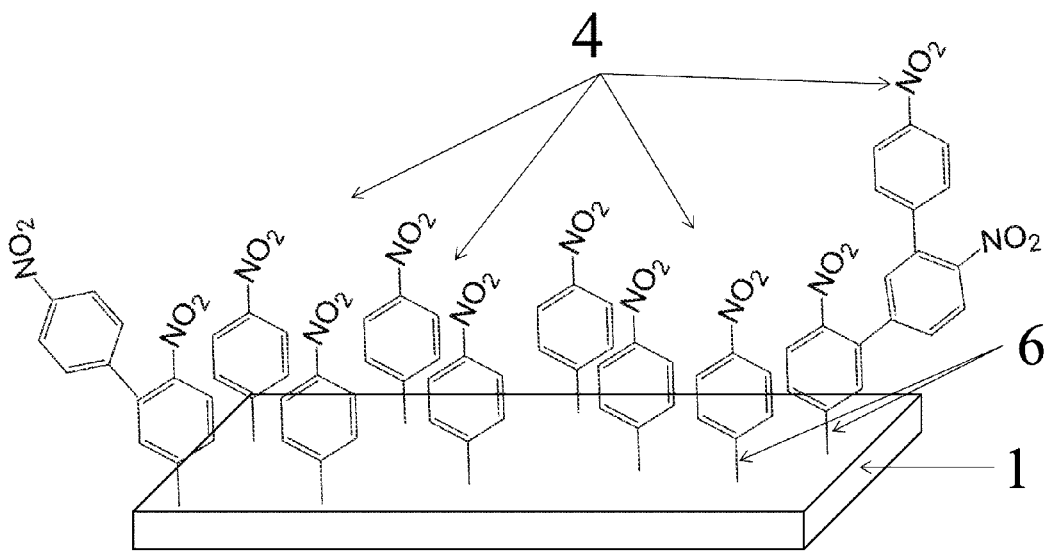
Figure 4:
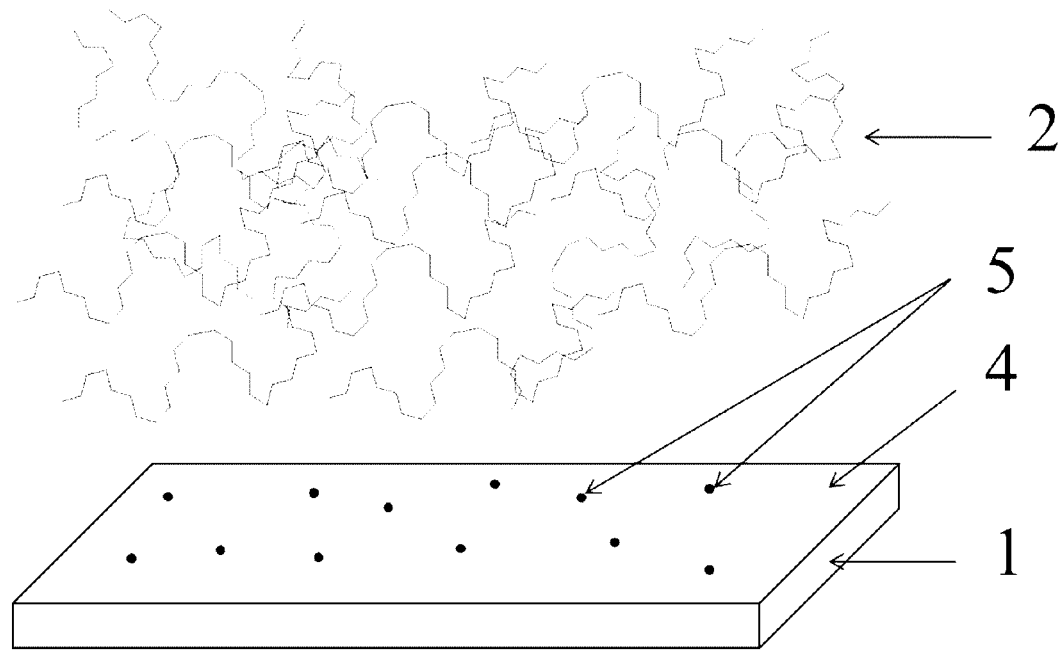

The application of a primer 4 is illustrated schematically in FIGS. 2-6. FIG. 2 shows the first step in which a reactive primer 4 is present above the upper surface 3, and FIG. 3 shows the situation where the primer 4 has been attached. The primer 4 is attached to the surface 3 by covalent bonds 6 so that a strong chemical bonding is obtained; this is shown schematically by the vertical lines at the lower end of the molecules in the figures. For electrically conducting materials this is typically done by grafting according to procedures which will be well known to a person skilled in the art. For some metals, such as stainless steel, the covalent bond formation can be greatly enhanced if the upper surface 3 is concomitantly electrochemically activated.

Figure 5:
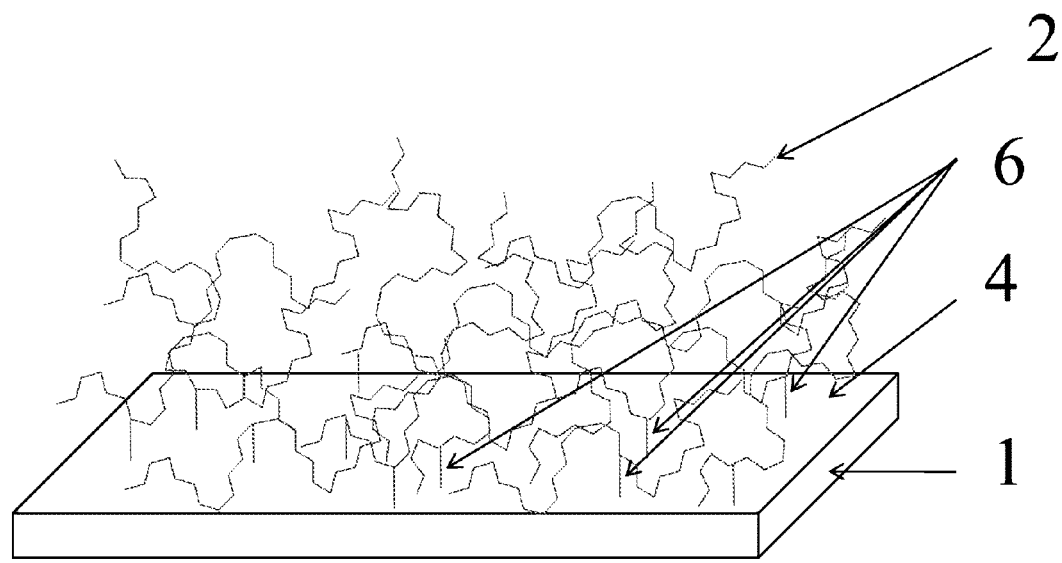
Figure 6:
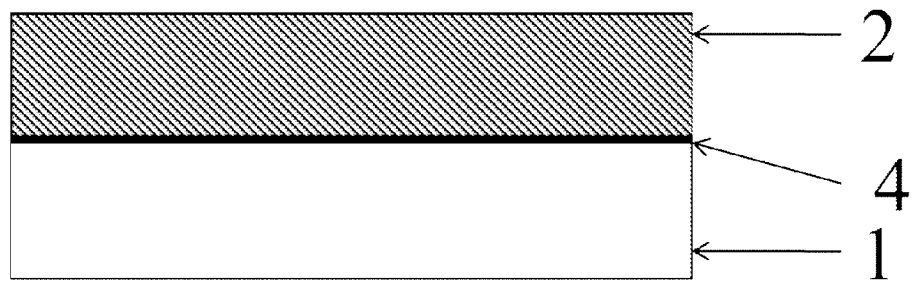

The primer layer 4 is heated with a predetermined temperature profile until at least a part of the primer 4 has been activated. In a first method according to the invention, a simultaneous or subsequent process step is to bring the surface 3 of the solid part 1 into contact with the polymer 2 so that an interface is obtained comprising the surface 3, the activated primer 4 and a part of the polymer 2 adjacent to the primer 4; this is shown schematically in FIG. 4, where the active primer sites 5 where reaction between the primer and the polymer will happen are illustrated schematically as dots. A predefined temperature profile is applied resulting in covalent bonds 6 being established between the polymer 2 and the activated primer 5 so that the solid part 1 and the polymer 2 remain joined after cooling via the covalent bonds 6 between the primer 4 and the solid part 1 as shown in FIG. 5. A schematical side view of a bonding resulting from this method is shown schematically in FIG. 6.

In the following, an example of a detailed description for an electrically conductive item, i.e. solid part 1, is provided to illustrate the method described above. Note that the primer type, thickness, etc. are adjusted to the particular material combination. The item, i.e. the solid part 1, is first cleaned thoroughly by polishing with diamond grit and then sonicated 3×10 min in clean solvent. It is then grafted or coated with a thin layer (<500 nm) of e.g. 4-nitrophenyl diazonium salt. This can be done by a large variety of methods, the most often employed one being electrochemically facilitated modification in which the salt is dissolved in a organic solvent, e.g. acetonitrile, to a concentration of 0.1-500 mM. The item is then employed as the working electrode in a 3-electrode setup and polarized in either potentiostatic or cyclic voltammetric manner. The density and thickness of the primer layer vary, depending on the procedure of choice. The details of this process will be known to a person skilled in the art. Once the primer layer has been grafted on the surface of the item, the item is cleaned from residual solvent, loosely bound organic layers, contaminations, etc., by ultrasonic cleaning methods in a range of solvents. The item is then either (A) placed in a mechanical fixing block for heat pressing or (B) placed in the appropriate tool in the injection moulding machine. The items are in case (A) not heated prior to being assembled in a sandwich setup, comprising the coated item, the polymer either as a premoulded item or as grains and a unmodified but mechanically structured reference item. Subsequently the combined fixing block is placed in a heat furnace, pressurized by mechanical means between 0-5 bars, programmed to reach and exceed the preset upper temperature limit, e.g. Tm+20° C. for the polymer and allowed to remain at that temperature for up to 30 min to secure the temperature uniformity throughout the material sandwich combination. The material is then allowed to cool down slowly by remaining in the furnace and turning off the heat. In case (B), the items are typically thermostated in an oven to a temperature of 60-140° C. The injection moulding machine operates with cooling circuit thermostated at 60-120° C. The items are after approx. 15 min placed in the mould and outsert moulded with a polymer, which is injected at a temperature being usually Tm+10-100° C. and pressure typically up to 1200 bar. The holding time is set to be from 5-300 s in order to allow the material combination to reach a state of thermal equilibrium. When the items are injected they are allowed to cool further down to room temperature on a rest in ambient conditions, typically 25° C. The joints are not to be put into service before the next day, i.e. any further crystallization or stress relaxation etc. is allowed to go on for a further 16-24 hrs before testing. In some cases the material combination is annealed at or around Tg of the polymer for 5-72 hrs in order to relieve or minimize any internal stresses in the polymer.

Figure 7:
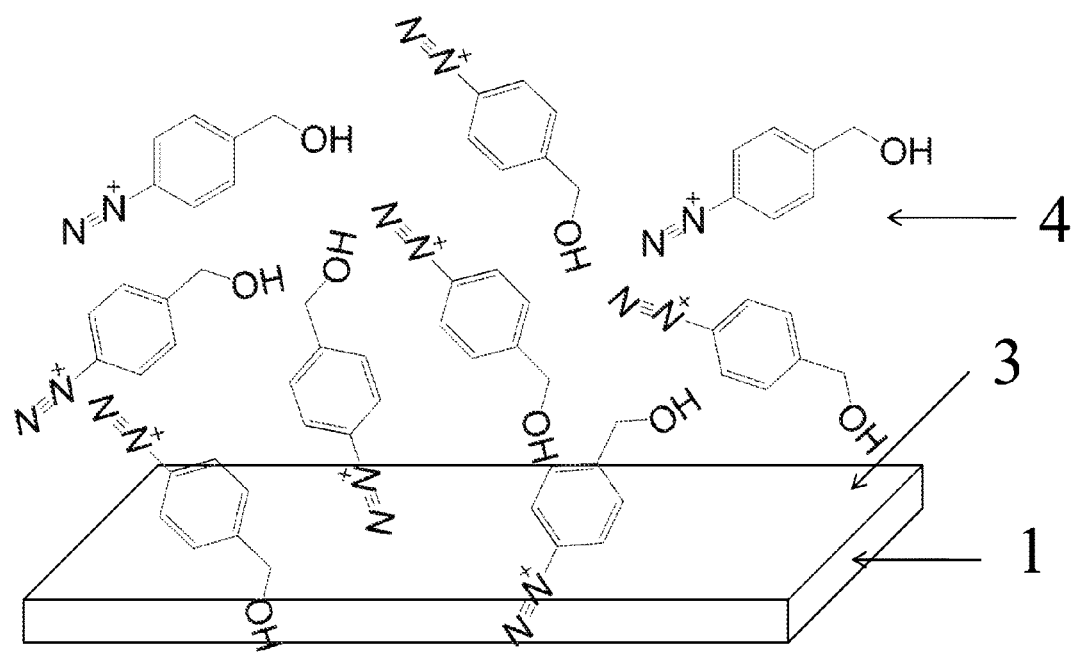
FIGS. 7 to 10 show schematically how to obtain a surface covered with surface immobilized polymer brushes.
Figure 8:
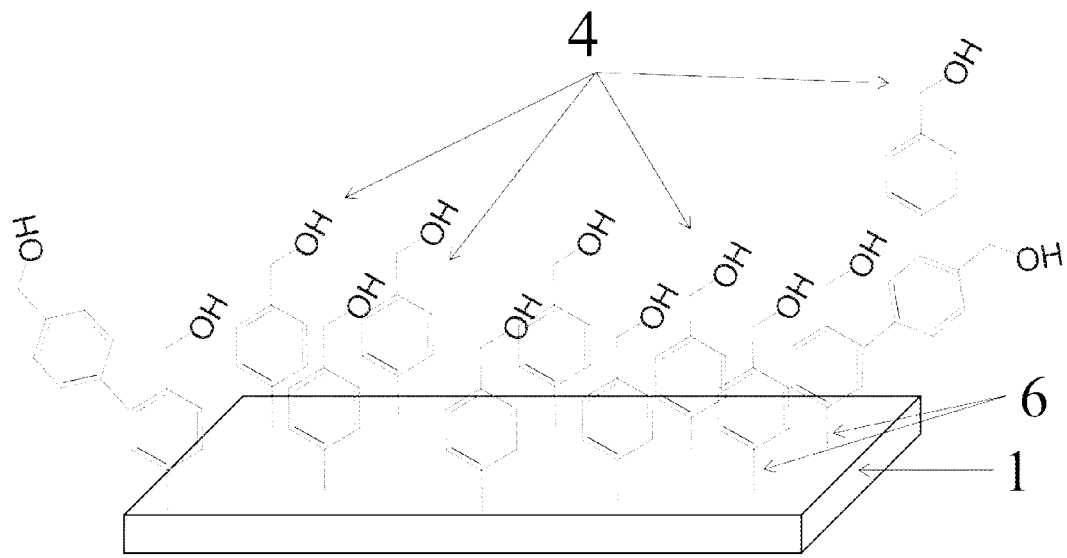

In a second and a third method according to the invention, second molecules are polymerized onto the primer layer 4 so that the surface 3 is at least partly covered with surface immobilized polymer brushes 8; this process is shown schematically in FIGS. 7-10. The wording "second molecules" is used here to distinguish the molecules from those in the primer. FIG. 7 shows the primer 4 being present above the upper surface 3 of the solid part, and FIG. 8 shows the situation where the primer 4 has been attached. The primer 4 is attached to the surface 3 by covalent bonds 6 so that a strong chemical bonding is obtained. The primer design is of utmost importance as it serves as basis for an initiator 7 in the subsequent polymerization process to form the tethered polymer chains also referred to as polymer brushes 8; this is shown schematically in FIG. 9. Attachment of the initiator 7 can e.g. be achieved through different pathways such as silane, diazonium and thiol chemistry or by attaching a precursor that is subsequently modified into an active initiator.

Figure 9:
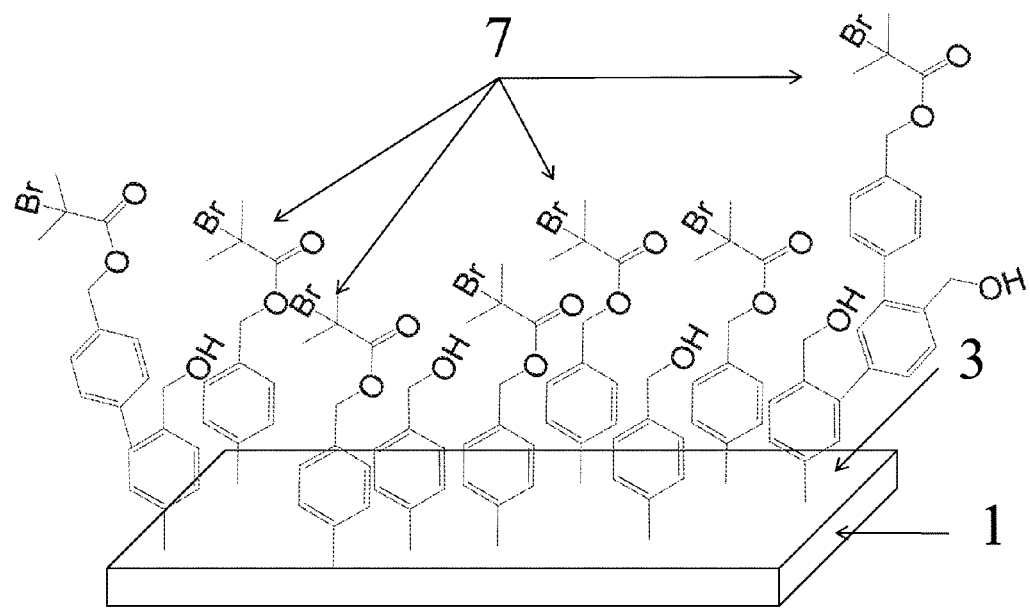
Figure 10:
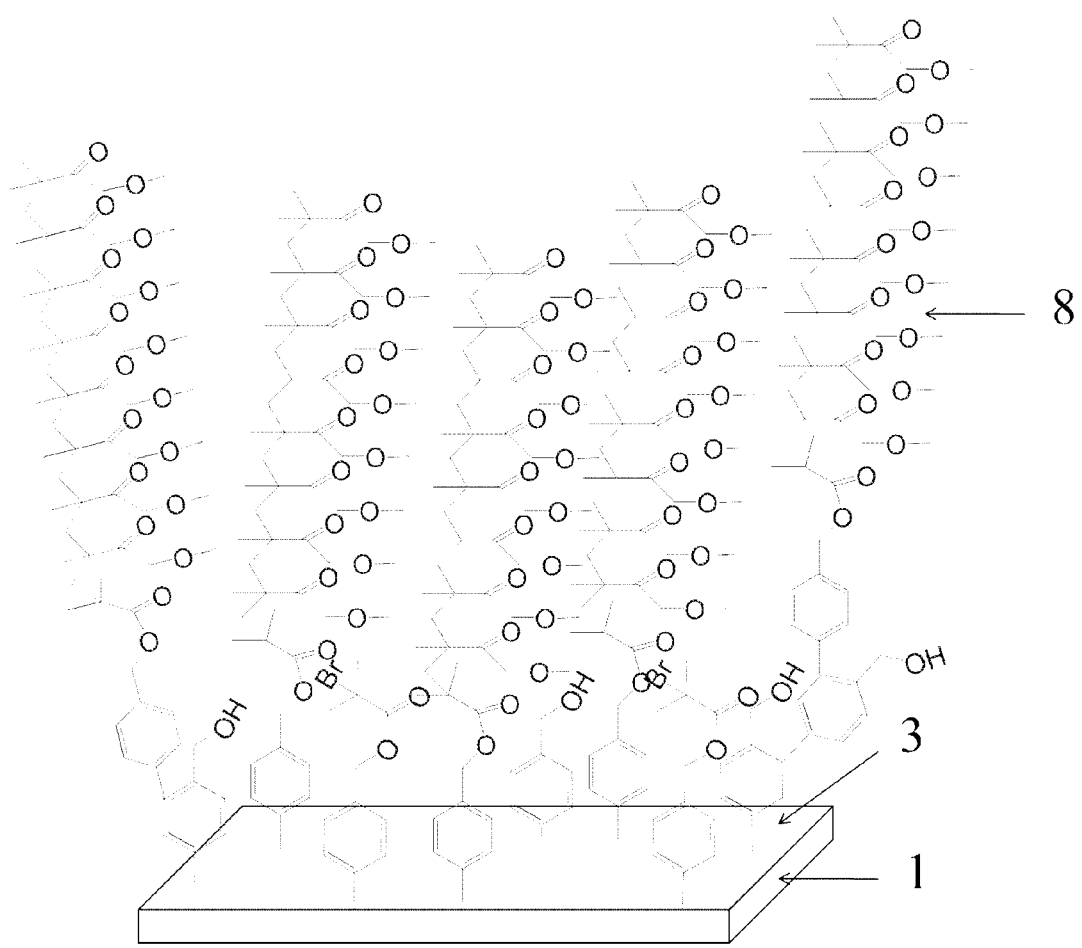

FIG. 9 shows the initiator 7, and FIG. 10 shows the length of the polymer brushes 8 after a longer duration of the polymerization step. The polymerization results in the upper surface 3 being covered with surface immobilized polymer brushes 8. In FIGS. 9 and 10, the whole surface 3 is covered with the polymer brushes 8, but it may also be possible to cover only part of the surface 3 if desired. This can e.g. be done by SECM, partial submersion or lithographical methods.

The polymerizing step has a duration resulting in a predetermined average length of the polymer brushes 8. The actual process parameters to use for a given application and combination of materials can be determined by experimentation, possibly assisted by theoretical approaches, possibly including computer simulations.

Figure 11:
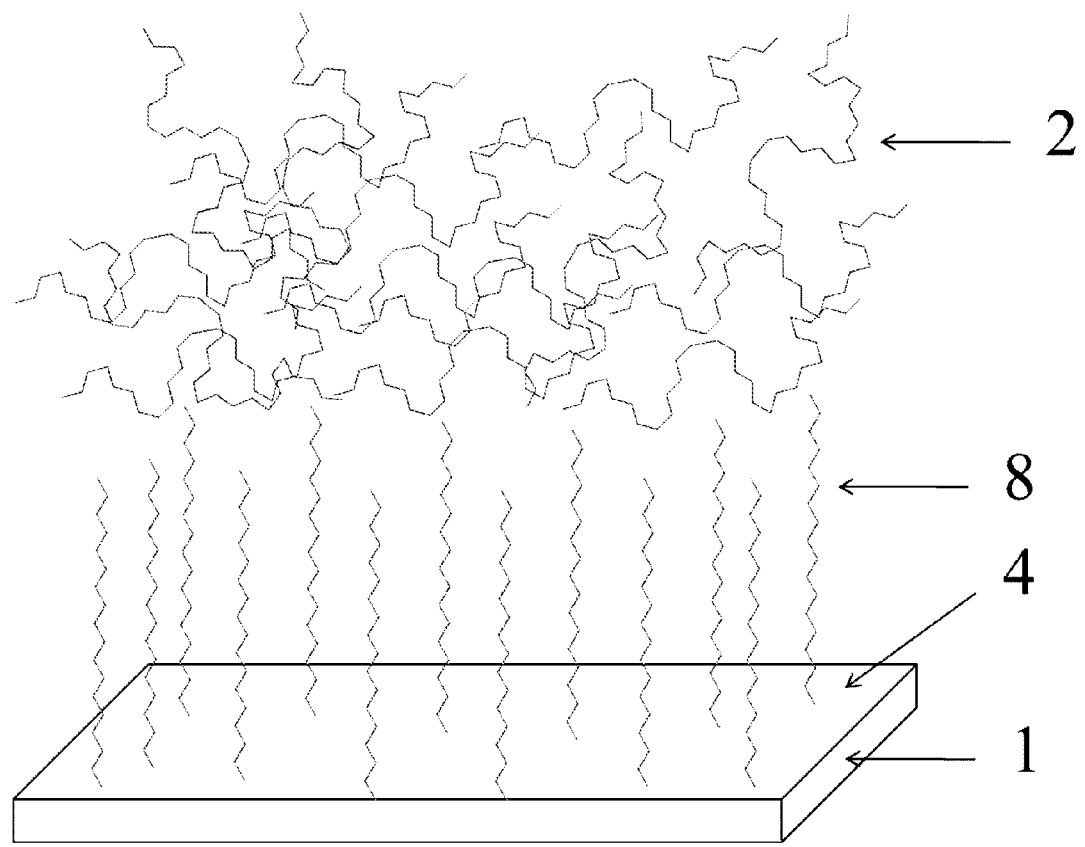
FIG. 11 shows schematically a polymer arranged above the polymer brushes.
Figure 12:
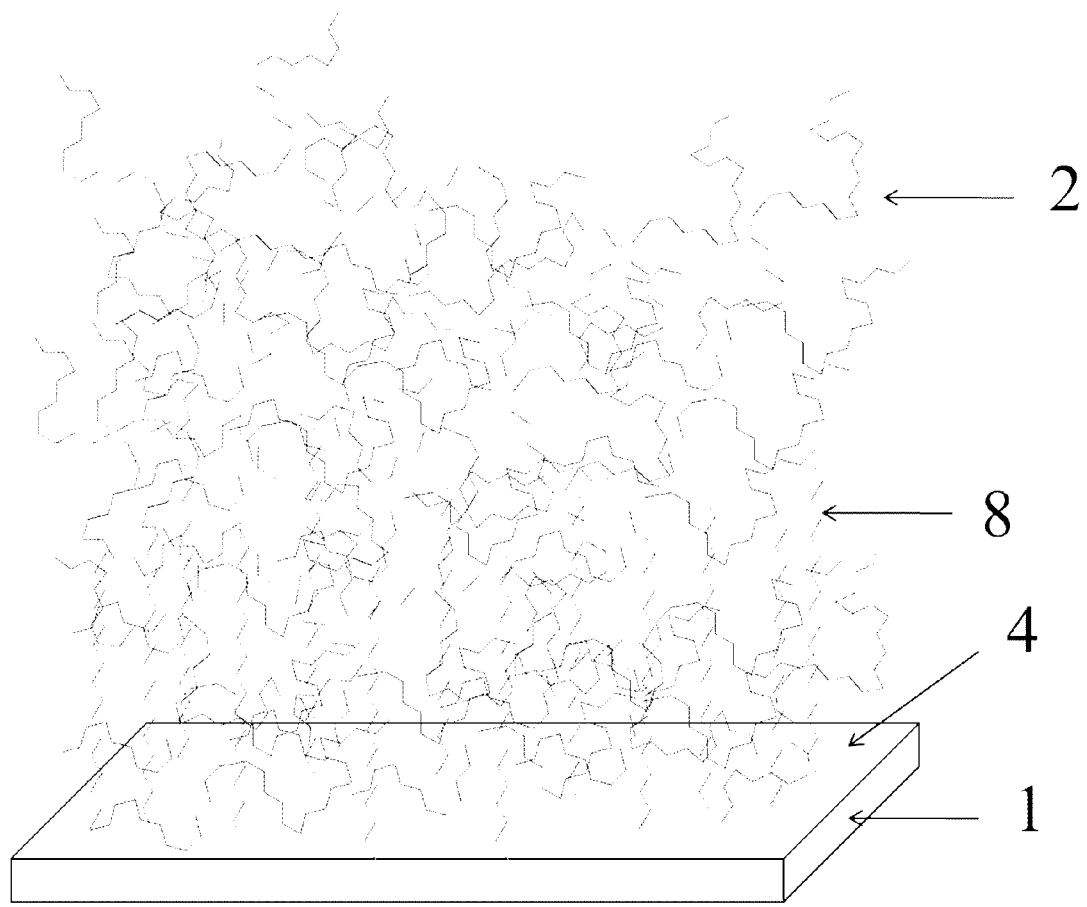
FIG. 12 shows schematically the entanglement between the polymer brushes and the polymer chains in the polymer to be joined with the solid part.
Figure 13:
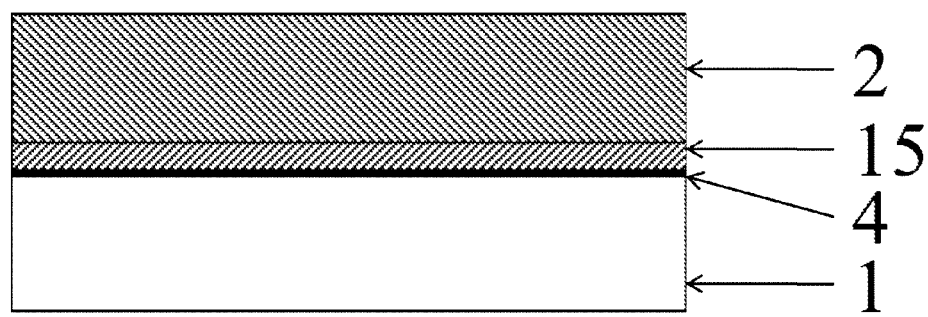
FIG. 13 shows schematically a cross sectional view of the solid part and polymer joined according to the method illustrated in FIGS. 7 to 12.

In the second method, the surface 3 with the polymer brushes 8 is then brought into contact with the polymer 2, so that an interface is obtained comprising the surface 3, the primer 4, the polymer brushes 8 and a part of the polymer 2 adjacent to the primer 4; this is shown schematically in FIG. 11. A predefined temperature profile is applied at least to the interface, so that the polymer brushes 8 melt or soften and entangle with melted or softened polymer so that the solid part 1 and the polymer 2 remain joined after cooling; this is shown schematically in FIG. 12. A schematical side view of a bonding resulting from this method is shown schematically in FIG. 13. A mixing zone 15 comprising the polymer brushes 8 and a part of the polymer 2 with which the polymer brushes 8 have entangled is established between the solid part 1 and the polymer 2 which are hereby joined.

In the following an example of the second method is given by a detailed description for an electrically conductive item, i.e. solid part 1. The item is first cleaned thoroughly by grinding or polishing and then sonicated in clean solvent. It is then grafted or coated with a thin layer (<500 nm) of e.g. 4-(2-hydroxyethyl)benzenediazonium salt. This can be done by a large variety of methods, the most often employed is an electrochemically facilitated method, in which the salt is dissolved in a organic solvent, e.g. acetonitrile, to a concentration of 0.1-500 mM. The item is then employed as the working electrode in e.g. a 3-electrode setup and polarized in either potentiostatic or cyclic voltammetric manner. The density and thickness or the primer layer 4 vary depending on the chosen procedure. The details of this process will be known to a person skilled in the art. Once the primer layer 4 has been grafted on the surface 3 of the item 1, the item is cleaned from residual solvent, loosely bound organic layers, contaminations, etc., by ultrasonic cleaning methods in a range of solvents. Subsequently, the primer 4 is modified into an active polymerization initiator 7 e.g. by reaction of 2-bromoisobutyryl bromide in dichloromethane at e.g. a concentration of 0.5 M, at ambient temperature for 12 hrs. The polymer brush density is controlled by variation in activation condition; e.g. by changing concentrations, time, and/or temperature. After modification, the item with the activated primer attached is cleaned in dichloromethane. The modified item is then immersed (or partly immersed) into a reaction solution consisting e.g. of acetone and methylmethacrylate (1:1, v:v) with pentamethyldiethylenetriamine (15.7 µL, 75.4 µmol), cupper(I) bromide (6.9 mg, 48.0 µmol), and, cupper(II) bromide (4.6 mg, 20.6 µmol). The reaction medium is degassed, stirred and heated to the polymerization temperature (e.g. 50° C.) before the modified items is immersed. The item is then polymerized for a specified time period in order to obtain a given thickness of the polymer brushes 8. The reaction mixture may at all times be kept under inert atmosphere (e.g. argon atmosphere). After polymerization the item with the attached polymer brushes 8 are cleaned e.g. by sonication in various good solvents for the polymer; the polymer being poly(methyl methacrylate) (PMMA) in this example.

The item is then placed in a mould for injection moulding. The items are in the closed mould assembled in a sandwich setup comprising the coated item, a gap to be filled with the polymer melt (at e.g. 260° C.), and an other coated or mechanically structured item. Subsequently, the polymer is injected into the gap at 800-1200 bar, and the mould is kept at a pre-set upper temperature, e.g. 120° C. and allowed to remain at that temperature for up to 300 s to secure packing and sufficient mixing time. The sandwich structure is then ejected and left to cool down to ambient temperature. The following day, testing of the adhesion strength is performed. In some cases the assembly is annealed at or around Tg of the polymer for 5-72 hr in order to relieve or minimize any internal stresses in the polymer.

Figure 14:
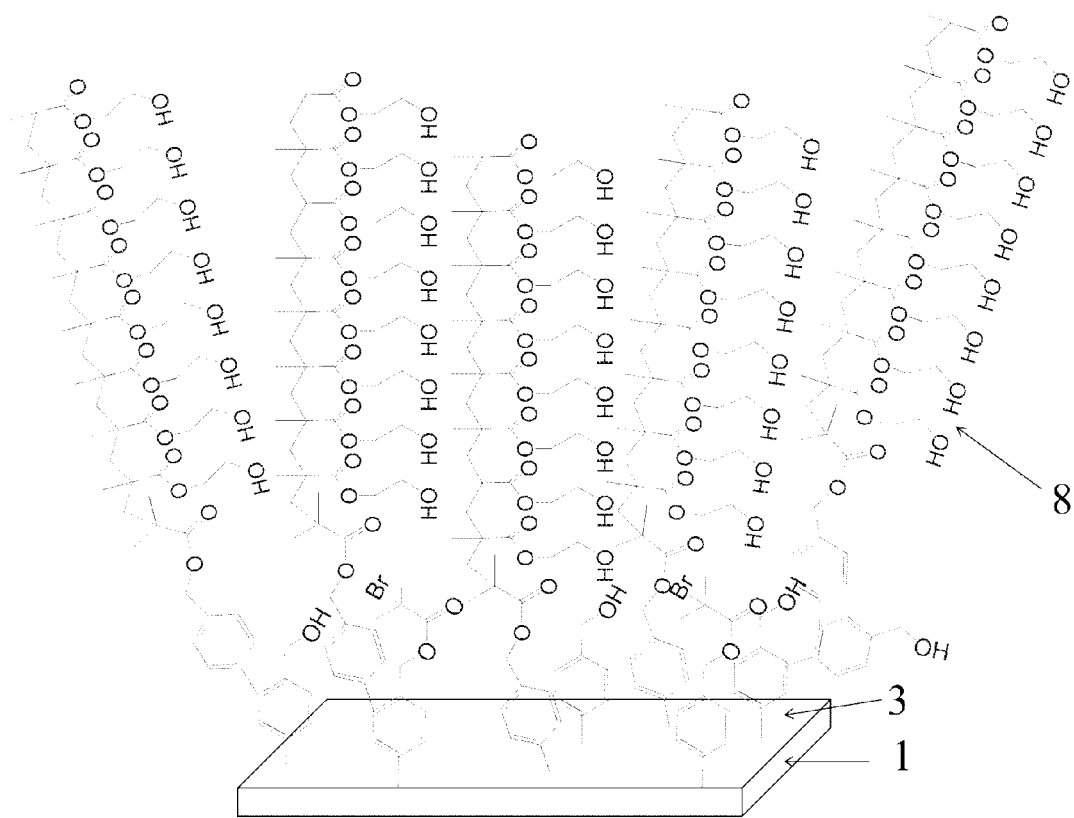
FIGS. 14 to 16 show the steps of the third method corresponding to those of the second method shown in FIGS. 10, 12 and 13. The difference is that in the third method, covalent bonds are formed between the polymer brushes and the polymer being joined thereto.
Figure 15:
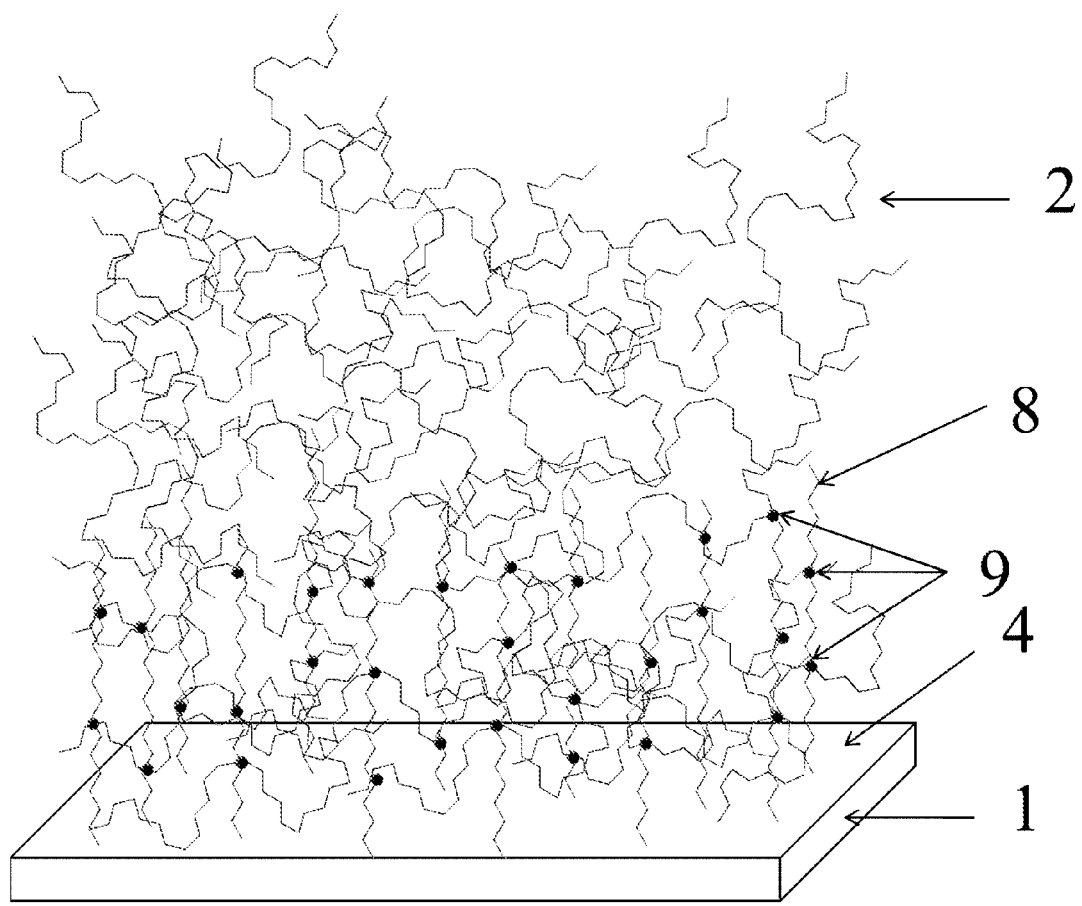
Figure 16:
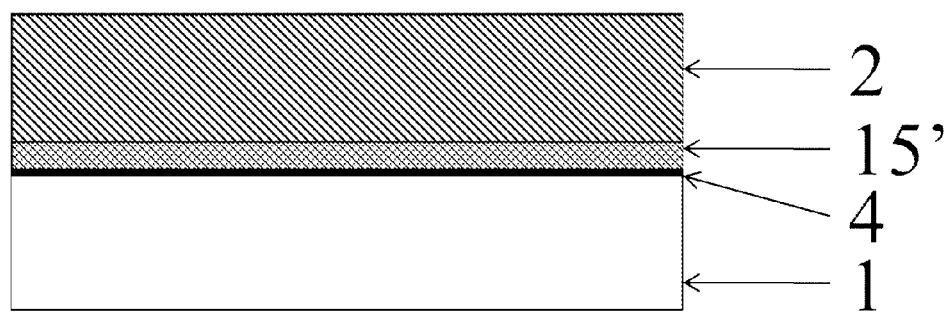

The third method differs from the second method in that it further comprises applying process parameters resulting in the polymer brushes 8 polymerized onto the primer layer 4 containing chemical functionalities amenable to thermal rearrangements, chain scission, fragmentation, or the like. The surface 3 with the polymer brushes 8 is heated with a temperature profile resulting in at least partial activation of the polymer brushes 8 and/or incorporated functional groups thereof. An example of the chemical structure of the polymer brushes 8 according to the third method is shown schematically in FIG. 14. The polymer brushes 8 melt or soften and mix with melted or softened polymer 2, and covalent bonds are established between the primer 4, the polymer brushes 8 and/or the polymer 2 so that the solid part 1 and the polymer 2 remain joined after cooling. The covalent bonds 9 between the polymer brushes 8 and the polymer 2 being attached thereto are shown as dots in FIG. 15. A schematical side view of a bonding resulting from this method is shown schematically in FIG. 16, where the cross hatching of the layer above the primer 4 indicates the incorporation of covalent bonds 9 between the polymer brushes 8 and the polymer 2. These covalent bonds 9 are the main resulting difference between the second and third methods. This means that a mixing zone 15' comprising the polymer brushes 8 and a part of the polymer 2 with which the polymer brushes 8 have entangled and also covalent bonds are established between the solid part 1 and the polymer 2; they are hereby joined.

In the following an example of the third method is given by a detailed description for an electrically conductive item, i.e. a solid part 1. The item is first cleaned thoroughly by grinding or polishing and then sonicated in clean solvent. It is then grafted or coated with a thin layer (<500 nm) of e.g. 4-(2-hydroxyethyl)benzenediazonium salt. This can be done by a large variety of methods; the most often employed is an electrochemically facilitated method, in which the salt is dissolved in a organic solvent, e.g. acetonitrile, to a concentration of 0.1-500 mM. The item is then employed as the working electrode in e.g. a 3-electrode setup and polarized in either potentiostatic or cyclic voltammetric manner. The density and thickness or the layer vary depending on the procedure of choice. The details of this process will be known to a person skilled in the art. Once the layer has been grafted on the surface of the item, the item is cleaned from residual solvent, loosely bound organic layers, contaminations, etc., by ultrasonic cleaning methods in a range of solvents. Subsequently the primer is modified into an active polymerization initiator e.g. by reaction of 2-bromoisobutyryl bromide in dichloromethane at e.g. a concentration of 0.5 M, at ambient temperature for 12 hrs. The polymer brush density is controlled by variation in activation conditions; e.g. by changing concentrations, time, and/or temperature. After modification, the item with the activated primer attached is cleaned in dichloromethane. The modified item is then immersed or partly immersed into a reaction solution consisting e.g. of water and 2-hydroxyethyl methacrylate (HEMA) (1:1, v:v, 6 mL) with 2,2'-bipyridine (82 mg, 522 µmol), cupper(I) bromide (17.8 mg, 180 µmol) and cupper (II) bromide (12.1 mg, 54 µmol). The reaction medium is degassed, stirred and heated to the polymerization temperature (e.g. 50° C.) before the modified item is immersed. The item is then polymerized for a specified time period in order to obtain a given thickness. The reaction mixture was at all times kept under inert atmosphere (e.g. Argon atmosphere). After polymerization the item with the attached polymer brushes are cleaned e.g. by sonication in various good solvents for the polymer which was poly(2-hydroxyethyl methacrylate), (pHEMA), in this example.

The item is then placed in a mechanical fixing block for heat pressing. The items are assembled in a sandwich setup comprising of the coated item 1, the polymer 2 (either as a premoulded item or as e.g. powders or pellets), and an other coated item 1, see FIG. 17. Subsequently, the entire assembly is pressurized up to 5 bars and placed in a furnace programmed to reach the pre-set upper temperature limit, e.g. Tm+20° C. for the polymer and allowed to remain at that temperature for up to 30 min to secure the temperature uniformity throughout the assembly. The material is then allowed to cool down in the furnace. The following day testing of the adhesion strength is performed. This can e.g. be done in a setup as shown in FIG. 18. In some cases the assembly is annealed at or around Tg of the polymer for 5-72 hrs in order to relieve or minimize any internal stresses in the polymer.

FIG. 19 shows schematically a method comprising polymer brushes 8, wherein a solvent 10 is applied to the polymer brushes 8 and possibly also to the polymer 2 prior to the step of bringing the surface with the polymer brushes 8 into contact with the polymer 2. This results in a softening of the polymer brushes 8 and the polymer 2 which facilitates the entanglement between the polymer chains and thereby joining of the solid part 1 and the polymer 2. In the method illustrated in the figure, polymer chains 11 of the same type of polymer as the one to be joined with the solid part 1 are contained in the solvent 10. These polymer chains 11 will entangle with the polymer brushes 8 which has proven to result in a better bonding between the polymer brushes 8 and the polymer 2 being joined thereto. After application of the solvent 10 containing the polymer chains 11, heating may be applied to remove access solvent and to anneal the deposited polymer layer, i.e. to reduce the crystallinity or the layer and maximise the amorphous polymer part, before the solid part 1 with the primer 4 and polymer brushes 8 is brought into contact with the polymer 2 to be joined with the solid part 1.

In some embodiments of the invention relating to any of the three methods described above, the heating is applied by laser light; this can e.g. be used to join a bulk polymer 2 with a metal part 1 covered with polymer brushes 8, i.e. according to the second and third methods. The heat can e.g. be applied by use of a precise and focused laser beam (possibly pulsed), until the polymer brushes 8 and the bulk polymer 2 at the interface melt or soften and mix. The application of the laser pulses is shown schematically in FIGS. 20.*a* and 20.*b* and indicated by L and the application of a pressure is indicated by P. The grey area in the figures illustrates the laser beam which is moved across the surface as indicated by the arrow and the two positions in FIGS. 20.*a* and 20.*b*, respectively. Any laser welding method resulting in a localized heating at the interface is considered to be covered by the present invention. Optimized laser welding process parameters for a given combination of materials can e.g. be determined by experiments using systematic variations in pressure and temperature with time. In addition, different laser sources and thereby different wavelengths, power levels, continuous wave (CW) or pulsed mode may be used; relevant sources include Nd-YAG, fibre, disc and the diode lasers, but other laser sources may also be relevant.

Some parameters of interest for a given optimization of the bonding strength are the brush density, the molecular weight of the brushes and the time-temperature-pressure processing route of the process. The necessary information about the surface properties can e.g. be obtained by combining different surface sensitive techniques such as Polarization Modulated Infrared Reflection Absorption Spectroscopy (PMIRRAS), ellipsometry, contact angle measurements, quartz crystal microbalance (QCM), and Atomic Force Microscopy (AFM).

FIG. 21 shows the results of experiments made to compare the normal strength of stainless steel (AISI 4301) items with surface immobilized PMMA brushes of various lengths. In all cases the molding was carried out with the following conditions: the core temperature of the injected PMMA was 260° C., the tool temperature was 120° C., the injection pressure was 1000 bar, and the holding pressure was 500 bar. The holding time, brush length, and density are provided with each entry in the following, where "brush length" refers to the dry brush layer thickness and not the length of the polymer brushes:

a) Blank item, brush length=0, brush density: 0, holding time=300 s;
b) Brush length ~5 nm, brush density: low, holding time=60 s;
c) Brush length ~5 nm, brush density: low, holding time=180 s;
d) Brush length ~5 nm, brush density: low, holding time=300 s;
e) Brush length ~30 nm, brush density: medium high, holding time=60 s;
f) Brush length ~30 nm, brush density: medium high, holding time=180 s;
g) Brush length ~30 nm, brush density: medium high, holding time=300 s;
h) Brush length ~35 nm, brush density: medium high, holding time=300 s;
i) Brush length ~45 nm, brush density: medium high, holding time=300 s;
j) Brush length ~10 nm, brush density: medium low, holding time=300 s;
k) Brush length ~3 nm, brush density: low, holding time=300 s.

From these results it is clear that the lengths and density of the polymerized layer and the subsequent holding or packing time play a pivotal role in the ultimate normal strength of the samples and thus the adhesion of the plastic to the metal part. After an initial optimization, a holding time of 300 s was found to provide the highest ultimate strength. A further layer property optimization revealed that in order to achieve the optimal strength, the length of the polymer brushes is important. In general terms; longer and higher density of brushes provide a higher ultimate strength. However, there is probably an upper limit to the density in the sense that once a very dense layer is formed it is doubtful whether the incoming polymer melt can sufficiently interact with the polymer brushes. Moreover, as seen in entries 10 and 11, it is also possible to get high strengths even with a low brush length and density. This may be ascribed to the temperature profiles and optimization thereof.

Figure 17:
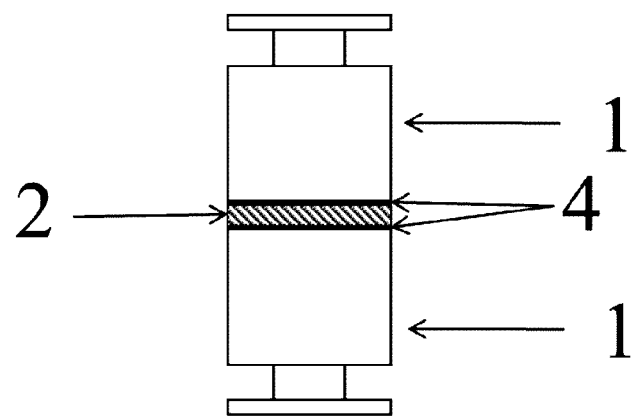
FIG. 17 shows schematically test specimens used for testing the strength of a bonding/entanglement.
Figure 18:
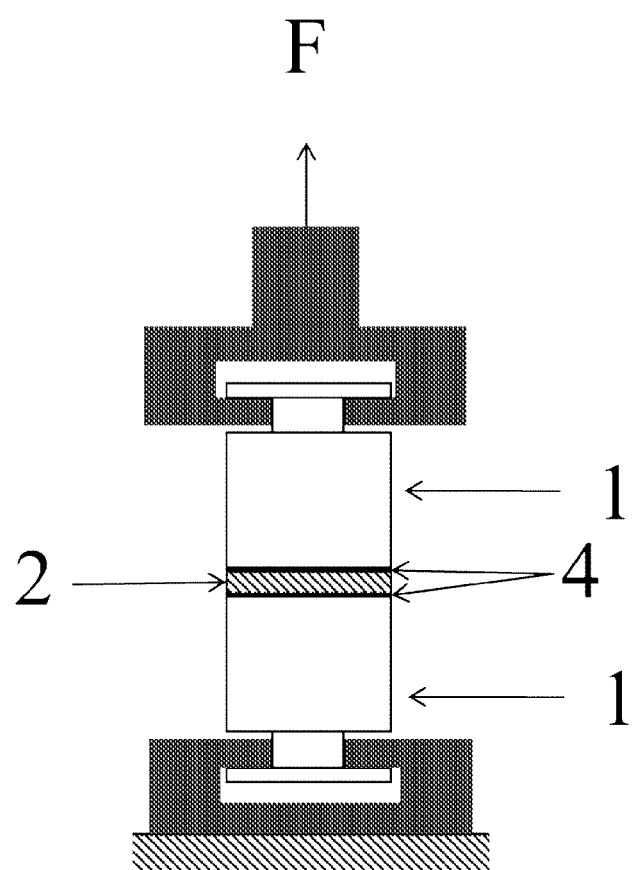
FIG. 18 shows schematically how a loading is applied to the test specimens of FIG. 17.
Figure 22:
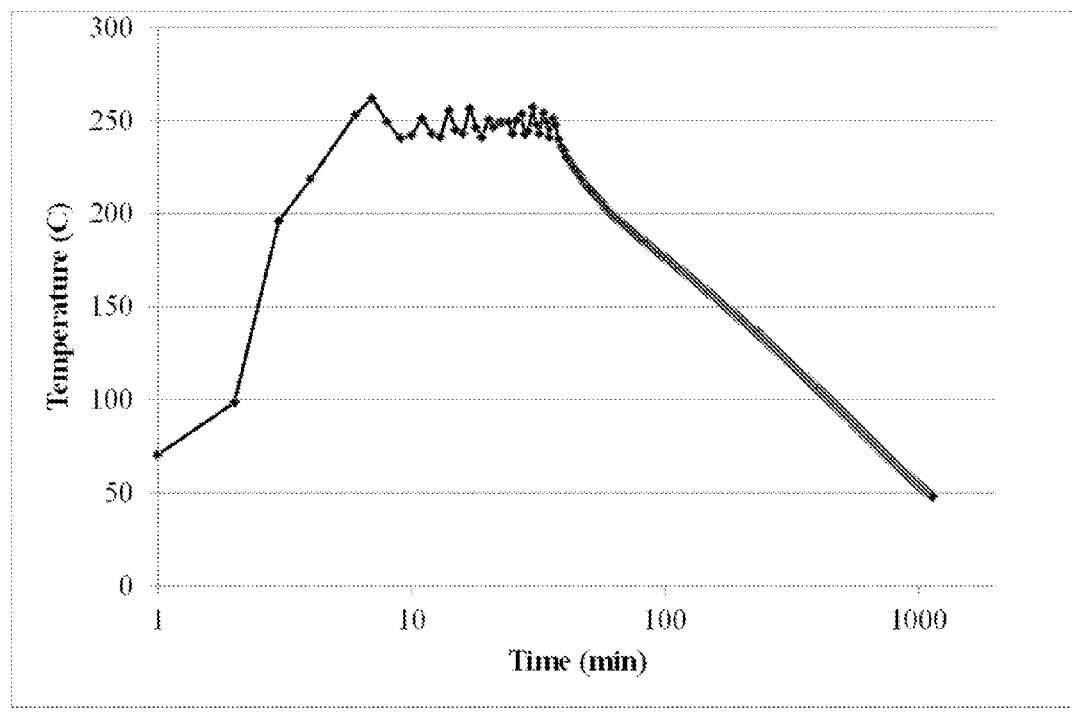
FIG. 22 shows an example of experimental results of a temperature profile applied during the joining process between stainless steel items with surface immobilized PMMA brushes of various lengths and a PMMA part

FIG. 22 shows a heating profile i.e. the temperature in the furnace at different times during the heating of the sandwich assembly shown in FIG. 17. Initially a 6-7 min temperature rise is seen followed by a holding time of 30 min which is then followed by a cooling period of approx. 960 min. In most cases the cooling period was accelerated and completed in 15-120 min.

Figure 23:
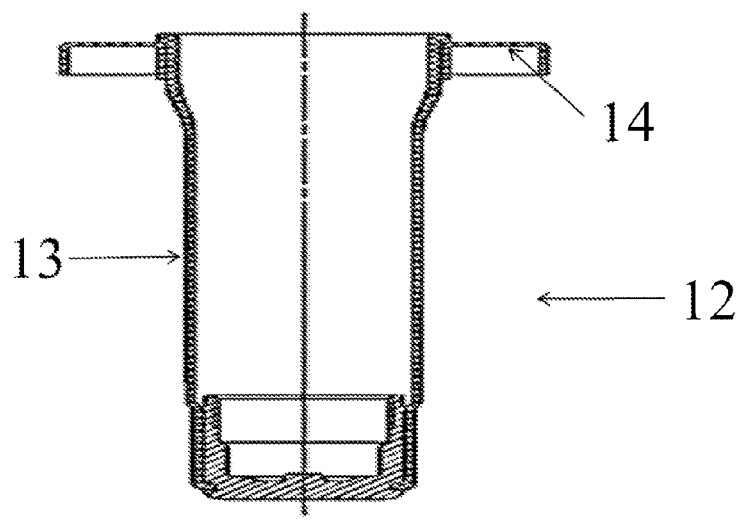
FIG. 23 shows a cross sectional view of a rotor can comprising a tubular shaped housing and a collar joined by a method according to the present invention.

FIG. 23 An example of an item obtained by a joining method according to the present invention is shown in cross sectional view. The item concerned is a polymer based rotor can 12 of a centrifugal pump (not shown). Such rotor cans 12 are e.g. known from EP2040354B1. The can 12 consists of a tube 13, in the form of a tubular shaped housing, which e.g. may be made of glass-fiber reinforced material, and may be closed in the one end. In the other end, or at both ends, a circular collar 14 is attached to the tube 13. The function of the collar 14 is to fixate the can 12 in the housing of an electrical motor part of a centrifugal pump. More precisely, around the outside of the can 13 the windings of an electrical stator (not shown) is placed, and inside the can 13 a rotor (not shown) is placed and electromagnetically coupled to the windings of the stator. The rotor is in a known manner a wet running rotor, i.e. the liquid being pumped by the pump also surrounds the rotor. This construction has the inherent drawback that there is a risk of leakage between the collar 14 and the tube 13, i.e. that liquid in unwanted manner will flow along the interface of collar 14 and tube 13. The collar 14 and the tube 13 may be in different materials, such as stainless steel and glass-fiber reinforced polymer, respectively, meaning that they cannot be joined by conventional means such as e.g. contact welding. By using a method according to the present invention, a practically fluid tight connection between collar 14 and tube 13 is achieved in the following way.

A stainless steel collar 14 is placed in an injection mould, typically of aluminium, which has been carefully adapted by steel grinding to present an injection shape internally in the mould similar to the tube 13. In another embodiment, a prefabricated tube 13, typically made by polymer extrusion, is heat-pressed onto the steel collar 14.

Prior to injection of polymer, the stainless steel collar 14 has been subjected to one or more of the steps of attaching a primer 4 or polymer brush 8 layer to its surface. The primer layer 4 has a predetermined surface chemistry, meaning that it consists of 10-100% of covalently attached substituted phenyl groups, in which the functional groups are found in or derived from the following groups; disulfide, alkoxy, hydroxy, nitro, cyano, halogen, carboxy, and 0-100% of covalently attached polymer brushes consisting of acrylates of the general formula $CH_3$—$CH(R)C(O)R'$, and 0-50% of diluting inactive groups, such as covalently attached unsubstituted phenyl groups.

The primer layer 4 has a surface density of $0.1\text{-}100 \times 10^{-10}$ mol per square centimeter, and a thickness of 1-1000 nanometers. In a preferred embodiment of the invention, the primer layer 4 has a surface density of $3\text{-}12 \times 10^{-10}$, such as $4\text{-}10 \times 10^{-10}$ mol per square centimeter, as this is considered appropriate for ensuring the primer layer 4 being as close to a perfect single layer of molecules as possible with the presently available methods. The primer layer 4 could be activated already when being placed in the mould. However, it would be more preferable to activate it when it is placed in the mould, and the most preferable would be that it is activated during the injection moulding process. This is because the mould has to be heated anyway, and because the temperature of the mould has been found to be controllable, and that the threshold temperature to be reached may be beneficial to reach for a controlled period of time only.

The primer layer 4 on the stainless steel collar 14 is now heated according to a first predefined temperature profile; the preferred profile is heating the injection moulding tools to 80-200° C. and then holding this temperature for 10-120 s. Alternatively, the stainless steel collar 14 is preheated outside the tool in an oven to reduce the cycle time in the tool. After activation, the machine injects, e.g., poly(phenylenesulfid) (PPS), which is a thermoplastic material able to withstand high temperatures. The temperature of the PPS is 290-330° C., and the pressure is 500-1200 bars. The PPS flows in the channels of the mould and takes the shape of the tube 13 and connects under high pressure to the collar 14 at the end of the tube 13. In this area an interface is obtained comprising the surface, the activated primer 4 and a part of the polymer 2 adjacent to the primer 4.

At this point a second predefined temperature profile is directly or indirectly applied to this interface. When the hot plastic reaches the collar 14, the temperature in the coating interface initially rises. However, as the tool is cooled continuously from the outside and thermostated at 80-200° C., the temperature of the collar soon starts to drop and eventually reaches the temperature of the mould. By adjusting the holding time and pressure, the temperature gradient on the collar may be controlled, at least to some extent. It has been found that a holding time between 10-300 s at a holding pressure of 300-1000 bars, most preferably between 60-300 s holding time at 5-800 bars provides the strongest joints.

The strength of this bonding has been measured in terms of normal strength. The test sample is made from two opposing pawns. These are known from e.g. ASTM D4541 for the testing of the adhesive strength of coatings. These are placed opposite to each other in a mechanical fixture with a 2 mm polymer disc in between and a separate metallic fixture to ensure an ultimate layer thickness of 1 mm. The oven was programmed at 20° C./min up to a temperature of 350° C. which was maintained for 30 min prior to cooling over 1 hr in the oven and then at ambient temperature. Once the polymer softens, the two pawns will under the externally applied pressure approach one another and thus become interconnected through the polymer melt.

Figure 24:
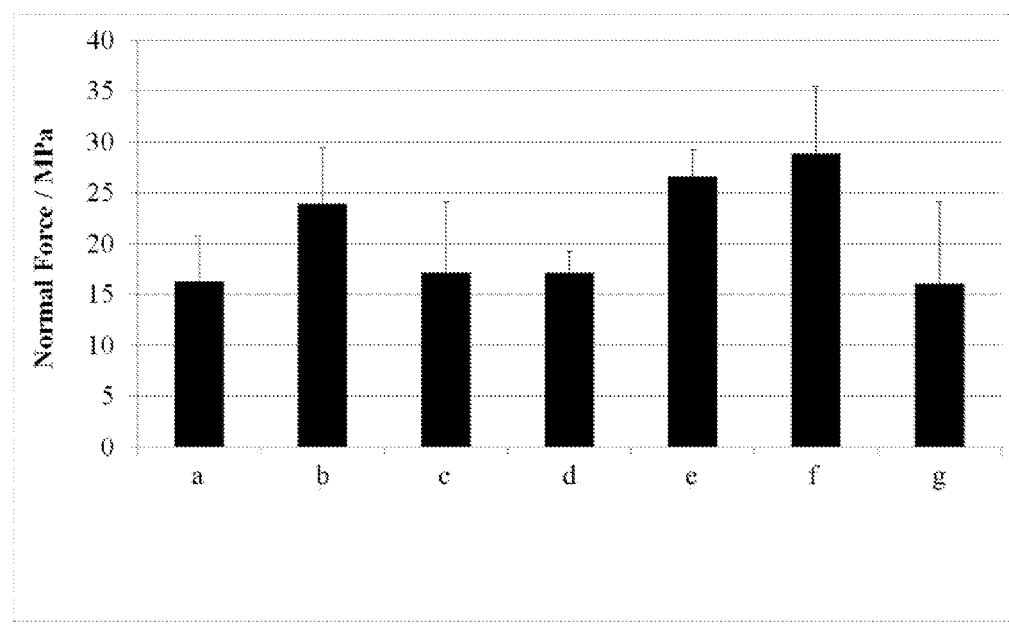
FIG. 24 shows experimental results of tests of primer strength.

The results are shown in FIG. 24. The figure compares the ultimate strength at breakage for a range of surface modifications on stainless steel.

These modifications are produced by electrochemical derivatization of stainless steel pawns utilizing diazonium precursors of the general formula $4\text{-}X\text{—}C_6H_4\text{—}N_2^+$. The normal strengths were measured on the following design of the test samples: stainless steel—coating—PPS—coating—stainless steel. The labeling on the x-axis refers to the following: a) reference on blank stainless steel 4301; b) X=OMe; c) X=H; d) X=F; e) X=CN; f) $X=NO_2$; and g) S—S-Ph. From these results it is clear that the nature of the organic coating plays a vital role in the ultimate normal strength of the samples and thus the adhesion of the plastic to the metal part. The strength of the coatings may be aligned with the thermal stability of the organic layers. At a certain threshold temperature, a triggering effect is initiated and the coatings are open for bonding. The threshold temperature depends on the nature of the substituents in the coating.

In another example relating to the one just described, the step of heating the primer layer 4 with a first temperature profile is replaced with a polymerization of second molecules on the primer layer. The polymerization is performed by known procedures for a so-called surface immobilized atom transfer radical polymerization, or SI-ATRP.

High strength results in the interface between metal and polymer were obtained with a primer layer 4 consisting of surface immobilized PMMA and brush lengths of 10 nm-200 nm. The temperature in the interface is approximately 180-230° C.

Tests have shown that a further increase in bonding strength in the interface of the tube 13 and the collar 14 was obtained if the solid part, i.e. the stainless steel collar, was structured in its surface before being joined to the polymer 2. In particular, laser structuring gave good results by generating a multiplum of micro pores, also called cavities, in the surface of the collar 14, preferably between 500 and 4000 pores pr square centimeter, each with a diameter between 20 and 200 micrometer and between 50 and 150 micrometers deep. Preferably, an organic coating, as described above, is later applied to the collar after laser structuring. This increases the strength in the interface even further.

Experiments have been performed for testing shear strength of various primers applied onto stainless steel samples before joining with PEEK before and after influenced by the presence of boiling water. Based on previous studies, it is at present considered most likely that when a stainless steel specimen having a PEEK coating applied is immersed in water, water transport along the interface can take place either by pore transport or progressive delamination which may at least partially be related to corrosion. A good adhesion between the metal and the polymer by chemical pre-treatments is crucial to avoid corrosion. In relation to the present invention it has been found that the use of carefully designed primers as an alternative to the traditionally used more environmentally harmful etching and anodizing treatment is important for improving the adhesion strength and durability further. However, as the following results show, it is important to select an appropriate primer for a given application and environment. In particular, formation of covalent bonds between the primer and the metal has been found to provide excellent protection against corrosion for some metals and thus a higher bonding strength.

Figure 25:
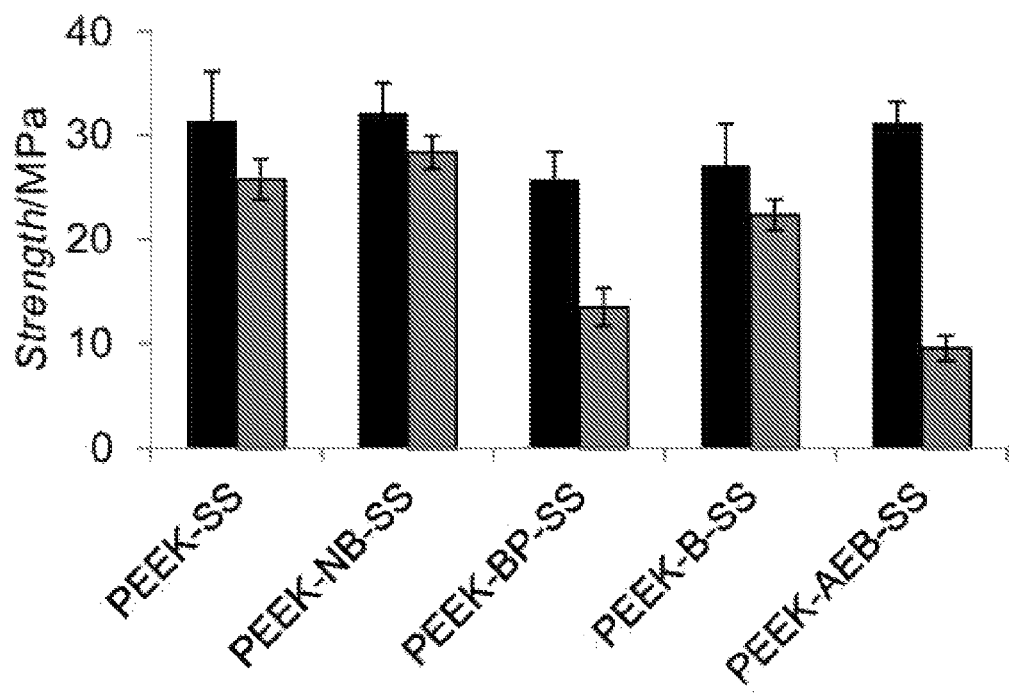
FIG. 25 shows experimental results of tests of the strengths of different primers under dry and wet conditions.

FIG. 25 shows the test results of four different primers applied to stainless steel (SS) before joining with PEEK. The y-axis shows the lap shear strength measured in MPa, and the different material combinations are shown along the x-axis. The lap strength was determined as the maximum load at failure divided by the geometrically projected joint area (100 mm²). The results shown are the average values from testing six samples. The samples were prepared from 1.5 mm thick stainless steel sheets (10×100 mm²) cleaned with sand paper (P180). Subsequently, the SS strips were washed thoroughly with deionized water followed by sonication for 10 min in acetone. 0.28 mm thick PEEK sheets were cut into 10×10 m² and dried in an oven at 130° C. for at least 3 hours prior to application.

Each material combination was tested under dry conditions (dark columns) and after 5 hours of boiling in tap water (grey columns). The first set of results, i.e. two adjacent columns, marked "PEEK-SS" relates to reference samples without primer, and the four other sets of results are for the following primers made from various types of aryldiazonium salts: 4-nitrobenzene (NB), 4-benzoylbenzene (BP), benzene (B), and 4-(2-aminoethyl)benzene (AEB) diazonium salts which were electrografted and applied as primers on stainless steel surfaces to test the resulting bond strength and durability of PEEK coating.

As can be seen from FIG. 25, only for the NB-primer, the strength of the adhesion is maintained after boiling (grey columns) when compared to the samples tested under dry conditions (dark columns).

Figure 26:
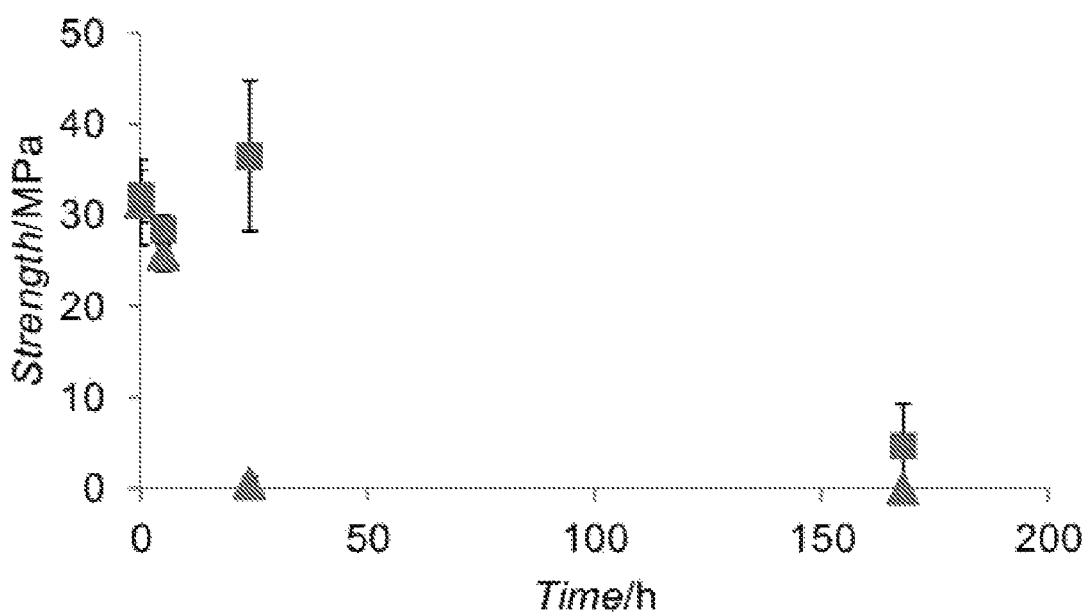
FIG. 26 shows further experimental results of tests of some of the material combinations in FIG. 25.

The tests in FIG. 25 were performed after immersion of the samples the in boiling water for 5 hours before testing. To further study how the lap shear strength is influenced by the time in water, further tests were performed on reference samples, i.e. PEEK-SS and samples with the NB-primer. FIG. 26 shows a plot of the lap shear strength of PEEK-SS and PEEK-NB-SS after having been immersed in boiling water for various periods of 0-168 hours as shown along the x-axis. The strength of the PEEK-SS sample decreases with immersing time to approach zero after 24 hours of immersion. At 168 hours, the joints were eventually debonded prior to the mechanical test resulting in a strength value of 0 MPa. By contrast, the strength of PEEK-NB-SS samples keeps more or less constant for 24 hours and the joints still adhere and show some strength after 168 hours. These results show how the shear strength of a metal-polymer joint (in this case stainless steel and PEEK) can be significantly improved by application of some but not all types of primers. The primer type and resulting chemistry of the bonding therefore has to be carefully chosen for a given combination of materials to joined. Experimental testing will play a large role in such choice, at least until a larger number of data is available.

Although the present invention has been described in connection with the specified embodiments, it should not be construed as being in any way limited to the presented examples. For example the method can also be used for joining of other materials than those specifically mentioned. An example of a polymer which may advantageously be joined to a metal part by use of the present invention is poly(vinylidene difluoride), PVDF.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of joining a solid part and a polymer, the method comprising:
    attaching a primer layer with a predetermined surface chemistry, density and thickness covalently to at least a part of a surface of the solid part,
    polymerizing second molecules onto the primer layer so that the surface is at least partly covered with surface immobilized polymer brushes,
    ensuring that the polymerizing results in surface immobilized polymer brushes containing chemical functionalities amenable to thermal rearrangements, chain scission, or fragmentation,
    heating the surface with the polymer brushes with an initial temperature profile resulting in at least partial activation of the polymer brushes and/or incorporated functional groups thereof, and
    bringing the surface with the polymer brushes into contact with the polymer so that an interface is obtained comprising the surface, the primer layer, the polymer brushes and a part of the polymer adjacent to the primer layer,
    wherein a predetermined temperature profile is applied at least to the interface, and/or
    wherein a solvent is applied to the polymer brushes and/or to the polymer prior to bringing the surface with the polymer brushes into contact with the polymer,
    so that the polymer brushes melt and/or soften and entangle with melted and/or softened polymer so that the solid part and the polymer remain joined, and wherein covalent bonds are established between the primer, the polymer brushes and/or the polymer.

2. The method according to claim 1, wherein bringing the surface into contact with the polymer is performed simultaneously with the heating of the surface with the polymer brushes with the initial temperature profile.

3. A method of joining a solid part and a polymer, the method comprising:
    attaching a primer layer with a predetermined surface chemistry, density and thickness covalently to at least a part of a surface of the solid part,
    polymerizing second molecules onto the primer layer so that the surface is at least partly covered with surface immobilized polymer brushes, and
    bringing the surface with the polymer brushes into contact with the polymer so that an interface is obtained comprising the surface, the primer layer, the polymer brushes and a part of the polymer adjacent to the primer layer,
    wherein a solvent is applied to the polymer brushes prior to bringing the surface with the polymer brushes into contact with the polymer, so that the polymer brushes soften and entangle with softened polymer so that the solid part and the polymer remain joined and, wherein said solvent comprises polymer chains of the same type of polymer as the polymer that is to be joined with the solid part.

4. The method according to claim 3, further comprising heating the polymer brushes with the solvent applied thereto before it is brought into contact with the polymer to be joined with the solid part.

5. A method of joining a solid part and a polymer, the method comprising:
    attaching a primer layer with a predetermined surface chemistry, density and thickness covalently to at least a part of a surface of the solid part,
    heating the primer layer with a first predetermined temperature profile until at least a part of the primer has been activated,
    simultaneously with or subsequently to the step of heating, bringing the primer layer attached to the surface of the solid part into contact with the polymer so that an interface is obtained comprising the surface, the activated primer and a part of the polymer adjacent to the primer, wherein a second predetermined temperature profile is applied at least to the interface resulting in covalent bonds being established between the polymer and the primer so that the solid part and the polymer remain joined after cooling.

6. The method according to claim 5, wherein the primer layer has a surface density of $0.1\text{-}100\times10^{-10}$ mol per square centimeter and a thickness of 1-1000 nanometers.

7. A rotor can for a centrifugal pump and comprising a solid part and a polymer which have been joined by a method according to claim 5, wherein the solid part is a metal collar of the can, and the polymer is a tubular body of the can.

8. The rotor can according to claim 7, wherein the joining is made in an injection molding process.

9. The rotor can according to claim 8, wherein activation of the primer layer on the collar is made in the mold by the heat of the mold.

10. The rotor can according to claim 8, wherein the collar is subjected to mechanical structuring on its surface before having a primer layer attached thereto, the structuring being mechanical, chemical or by laser.

11. The rotor can according to claim 10, wherein an organic chemical coating is applied to the collar before joining.

12. A method of joining a solid part and a polymer, the method comprising:

attaching a primer layer with a predetermined surface chemistry, density and thickness covalently to at least a part of a surface of the solid part, polymerizing second molecules onto the primer layer so that the surface is at least partly covered with surface immobilized polymer brushes, and bringing the surface with the polymer brushes into contact with the polymer so that an interface is obtained comprising the surface, the primer layer, the polymer brushes and a part of the polymer adjacent to the primer layer, wherein a predetermined temperature profile is applied at least to the interface, and/or wherein a solvent is applied to the polymer brushes and/or to the polymer prior to bringing the surface with the polymer brushes into contact with the polymer, so that the polymer brushes melt and/or soften and entangle with melted and/or softened polymer so that the solid part and the polymer remain joined, and wherein the primer layer has a surface density of $0.1\text{-}100\times10^{-10}$ mol per square centimeter and a thickness of 1-1000 nanometers.

13. A rotor can for a centrifugal pump and comprising a solid part and a polymer which have been joined by a method comprising:

attaching a primer layer with a predetermined surface chemistry, density and thickness covalently to at least a part of a surface of the solid part, polymerizing second molecules onto the primer layer so that the surface is at least partly covered with surface immobilized polymer brushes, and bringing the surface with the polymer brushes into contact with the polymer so that an interface is obtained comprising the surface, the primer layer, the polymer brushes and a part of the polymer adjacent to the primer layer, wherein a predetermined temperature profile is applied at least to the interface, and/or wherein a solvent is applied to the polymer brushes and/or to the polymer prior to bringing the surface with the polymer brushes into contact with the polymer, so that the polymer brushes melt and/or soften and entangle with melted and/or softened polymer so that the solid part and the polymer remain joined, and wherein the solid part is a metal collar of the can, and the polymer is a tubular body of the can.

14. The rotor can according to claim 13, wherein the joining is made in an injection molding process.

15. The rotor can according to claim 14, wherein activation of the primer layer on the collar is made in the mold by the heat of the mold.

16. The rotor can according to claim 14, wherein the collar is subjected to mechanical structuring on its surface before having a primer layer attached thereto, the structuring being mechanical, chemical or by laser.

17. The rotor can according to claim 16, wherein an organic chemical coating is applied to the collar before joining.

* * * * *